US012750566B1

(12) United States Patent
Killick et al.

(10) Patent No.: US 12,750,566 B1
(45) Date of Patent: *Sep. 29, 2026

(54) DYNAMIC SPLICE POINT ADJUSTMENT FOR VIDEO SIGNALS

(71) Applicant: Cox Communications, Inc., Atlanta, GA (US)

(72) Inventors: Ray Killick, Alpharetta, GA (US); Jayasri Devalapalli, Alpharetta, GA (US); Muhammad Asif Raza, Norcross, GA (US); Ramkumar Krishnan, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/967,239

(22) Filed: Dec. 3, 2024

Related U.S. Application Data

(63) Continuation of application No. 18/236,084, filed on Aug. 21, 2023, now Pat. No. 12,177,536, which is a continuation of application No. 17/722,984, filed on Apr. 18, 2022, now Pat. No. 11,736,781.

(51) Int. Cl.

| | |
|---|---|
| ***H04N 21/845*** | (2011.01) |
| ***H04N 21/2187*** | (2011.01) |
| ***H04N 21/854*** | (2011.01) |

(52) U.S. Cl.
CPC ..... *H04N 21/8455* (2013.01); *H04N 21/2187* (2013.01); *H04N 21/8456* (2013.01); *H04N 21/85406* (2013.01)

(58) Field of Classification Search
CPC ........... H04N 21/8455; H04N 21/2187; H04N 21/8456; H04N 21/85406
See application file for complete search history.

(56) References Cited

U.S. PATENT DOCUMENTS

| | | | | |
|---|---|---|---|---|
| 6,806,909 | B1 * | 10/2004 | Radha | H04N 21/233 375/E7.023 |
| 8,781,003 | B2 | 7/2014 | Beheydt et al. | |
| 9,668,007 | B2 | 5/2017 | Van Veldhuisen | |
| 10,602,235 | B2 | 3/2020 | Smith et al. | |
| 11,736,781 | B1 * | 8/2023 | Killick | H04N 21/2187 386/241 |

(Continued)

*Primary Examiner* — Sunghyoun Park

(74) *Attorney, Agent, or Firm* — Merchant & Gould P.C.

(57) ABSTRACT

Aspects of the present disclosure reduce visual artifacts and provide robust video signals to end-user equipment. According to an aspect, a system includes a splice point controller that analyzes video to detect and compensate for content boundary misalignments. The splice point controller can process video streams by analyzing splice point parameters and/or dynamically updating adjustment values associated with splice points to ensure appropriate transitions from primary content to secondary or alternate content. After determining an adjustment value for a splice point, the splice point controller can provide splice point adjustment feedback to a signal processing engine and/or to a secondary content source as part of synchronizing outputs of a transcoder farm and/or the secondary content source. For example, the splice point controller can operate to align a splice point adjustment value associated with an SCTE-35 descriptor with an actual live splice point time that is included with a live broadcast.

20 Claims, 15 Drawing Sheets

(56) References Cited

U.S. PATENT DOCUMENTS

| | | | | |
|---|---|---|---|---|
| 12,177,536 | B1 | 12/2024 | Killick et al. | |
| 2004/0218093 | A1 | 11/2004 | Radha et al. | |
| 2009/0217318 | A1 * | 8/2009 | VerSteeg | G06Q 30/02<br>725/32 |
| 2012/0137015 | A1 | 5/2012 | Sun | |
| 2015/0201227 | A1 | 7/2015 | Krasko et al. | |
| 2016/0366452 | A1 * | 12/2016 | Roessler | H04N 21/2335 |
| 2017/0132820 | A1 | 5/2017 | Zhou | |
| 2017/0278546 | A1 | 9/2017 | Xiao et al. | |
| 2018/0091820 | A1 * | 3/2018 | Gonzalez | H04N 19/169 |
| 2018/0376177 | A1 | 12/2018 | Nugent et al. | |
| 2019/0075148 | A1 | 3/2019 | Nielsen et al. | |
| 2020/0107003 | A1 * | 4/2020 | Phillips | H04N 13/344 |
| 2020/0128305 | A1 | 4/2020 | Romrell et al. | |
| 2021/0044778 | A1 | 2/2021 | Wang | |
| 2022/0337803 | A1 | 10/2022 | Shimakawa | |

* cited by examiner

```
frame:9032 pts:13605092 pts_time:151.168 lavfi.scene_score=0.585426
frame:9033 pts:13606593 pts_time:151.184 lavfi.scene_score=0.005829
frame:9034 pts:13608095 pts_time:151.201 lavfi.scene_score=0.042316
frame:9035 pts:13609596 pts_time:151.218 lavfi.scene_score=0.002570
frame:9036 pts:13611098 pts_time:151.234 lavfi.scene_score=0.000426
frame:9037 pts:13612599 pts_time:151.251 lavfi.scene_score=0.046931
frame:9038 pts:13614101 pts_time:151.268 lavfi.scene_score=0.002479
frame:9039 pts:13615602 pts_time:151.284 lavfi.scene_score=0.051971
frame:9040 pts:13617104 pts_time:151.301 lavfi.scene_score=0.001948
frame:9041 pts:13618605 pts_time:151.318 lavfi.scene_score=0.000339
frame:9042 pts:13620107 pts_time:151.335 lavfi.scene_score=0.059728
frame:9043 pts:13621608 pts_time:151.351 lavfi.scene_score=0.002956
frame:9044 pts:13623110 pts_time:151.368 lavfi.scene_score=0.063000
frame:9045 pts:13624611 pts_time:151.385 lavfi.scene_score=0.003724
frame:9046 pts:13626113 pts_time:151.401 lavfi.scene_score=0.001413
frame:9047 pts:13627614 pts_time:151.418 lavfi.scene_score=0.058701
frame:9048 pts:13629116 pts_time:151.435 lavfi.scene_score=0.003207
frame:9049 pts:13630617 pts_time:151.451 lavfi.scene_score=0.057943
frame:9050 pts:13632119 pts_time:151.468 lavfi.scene_score=0.002846
frame:9051 pts:13633620 pts_time:151.485 lavfi.scene_score=0.000503
frame:9052 pts:13635122 pts_time:151.501 lavfi.scene_score=0.058310
frame:9053 pts:13636623 pts_time:151.518 lavfi.scene_score=0.003249
frame:9054 pts:13638125 pts_time:151.535 lavfi.scene_score=0.068459
frame:9055 pts:13639626 pts_time:151.551 lavfi.scene_score=0.001673
frame:9056 pts:13641128 pts_time:151.568 lavfi.scene_score=0.000442
frame:9057 pts:13642629 pts_time:151.585 lavfi.scene_score=0.068151
```

FIGURE 6A

```
frames.frame.9056.repeat_pict=0
frames.frame.9056.color_range="tv"
frames.frame.9056.color_space="unknown"
frames.frame.9056.color_primaries="unknown"
frames.frame.9056.color_transfer="unknown"
frames.frame.9056.chroma_location="left"
frames.frame.9056.side_data_list.side_data.0.side_data_type="Active format description"
frames.frame.9056.side_data_list.side_data.1.side_data_type="ATSC A53 Part 4 Closed Captions"
frames.frame.9057.media_type="video"
frames.frame.9057.stream_index=0
frames.frame.9057.key_frame=1
frames.frame.9057.pkt_pts=[illegible]
frames.frame.9057.pkt_pts_time="40056.085433"
frames.frame.9057.pkt_dts=3605047689
frames.frame.9057.pkt_dts_time="40056.085433"
frames.frame.9057.best_effort_timestamp=3605047689
frames.frame.9057.best_effort_timestamp_time="40056.085433"
frames.frame.9057.pkt_duration=1501
frames.frame.9057.pkt_duration_time="0.016678"
frames.frame.9057.pkt_pos="11758312"
frames.frame.9057.pkt_size="120632"
frames.frame.9057.width=1280
frames.frame.9057.height=720
frames.frame.9057.pix_fmt="yuv420p"
frames.frame.9057.sample_aspect_ratio="1:1"
frames.frame.9057.pict_type="I"
frames.frame.9057.coded_picture_number=9098
frames.frame.9057.display_picture_number=0
frames.frame.9057.interlaced_frame=0
frames.frame.9057.top_field_first=0
frames.frame.9057.repeat_pict=0
frames.frame.9057.color_range="tv"
```

FIGURE 6B

```
* SCTE 35 Splice Information, TID 252 (0xFC), PID 139 (0x008B)
  Short section, total size: 78 bytes
  - Section 0:
    Protocol version: 0
    Encryption: none
    PTS adjustment: 0x0D6E0A989 (3,606,047,689, 40,056,085 ms)
    CW index: 0x00 (0), tier: 0xFFF (4095)
    Command type: 0x06 (TimeSignal), size: 5 bytes
    Time: 0x000000000
    - Descriptor 0: SCTE 35 Segmentation (0x02, 2), 51 bytes
      Identifier: 0x43554549 ("CUEI")
      Segmentation event id: 0x000000D4, cancel: 0
      Program segmentation: 1, has duration: 1, not restricted: 1
      Segment duration: 10800000
      Segmentation upid type: 0x09 (ADI)
      Upid data (31 bytes):
        0000:  53 49 47 4E 41 4C 3A 63 45 52 70 78 5A 67 6E 77  SIGNAL:cERpxZgnw
        0010:  57 41 41 41 41 41 41 78 4B 63 42 41 51 3D 3D     WAAAAAAxKcBAQ==
      Segmentation type id: 0x36 (Distributor Placement Opportunity Start)
      Segment number: 0, expected segments: 0
    CRC32: 0xE9D40665 (OK)

* SCTE 35 Splice Information, TID 252 (0xFC), PID 139 (0x008B)
  Short section, total size: 73 bytes
  - Section 0:
    Protocol version: 0
    Encryption: none
    PTS adjustment: 0x0D709DB3A (3,607,747,386, 40,086,082 ms)
    CW index: 0x00 (0), tier: 0xFFF (4095)
    Command type: 0x06 (TimeSignal), size: 5 bytes
    Time: 0x000000000
    - Descriptor 0: SCTE 35 Segmentation (0x02, 2), 46 bytes
      Identifier: 0x43554549 ("CUEI")
      Segmentation event id: 0x000000D4, cancel: 0
      Program segmentation: 1, has duration: 0, not restricted: 1
      Segmentation upid type: 0x09 (ADI)
      Upid data (31 bytes):
        0000:  53 49 47 4E 41 4C 3A 63 45 52 70 78 5A 67 6E 77  SIGNAL:cERpxZgnw
        0010:  57 41 41 41 41 41 41 78 4B 63 42 41 67 3D 3D     WAAAAAAxKcBAg==
      Segmentation type id: 0x37 (Distributor Placement Opportunity End)
      Segment number: 1, expected segments: 4
    CRC32: 0x8CBC2492 (OK)
```

FIGURE 6C

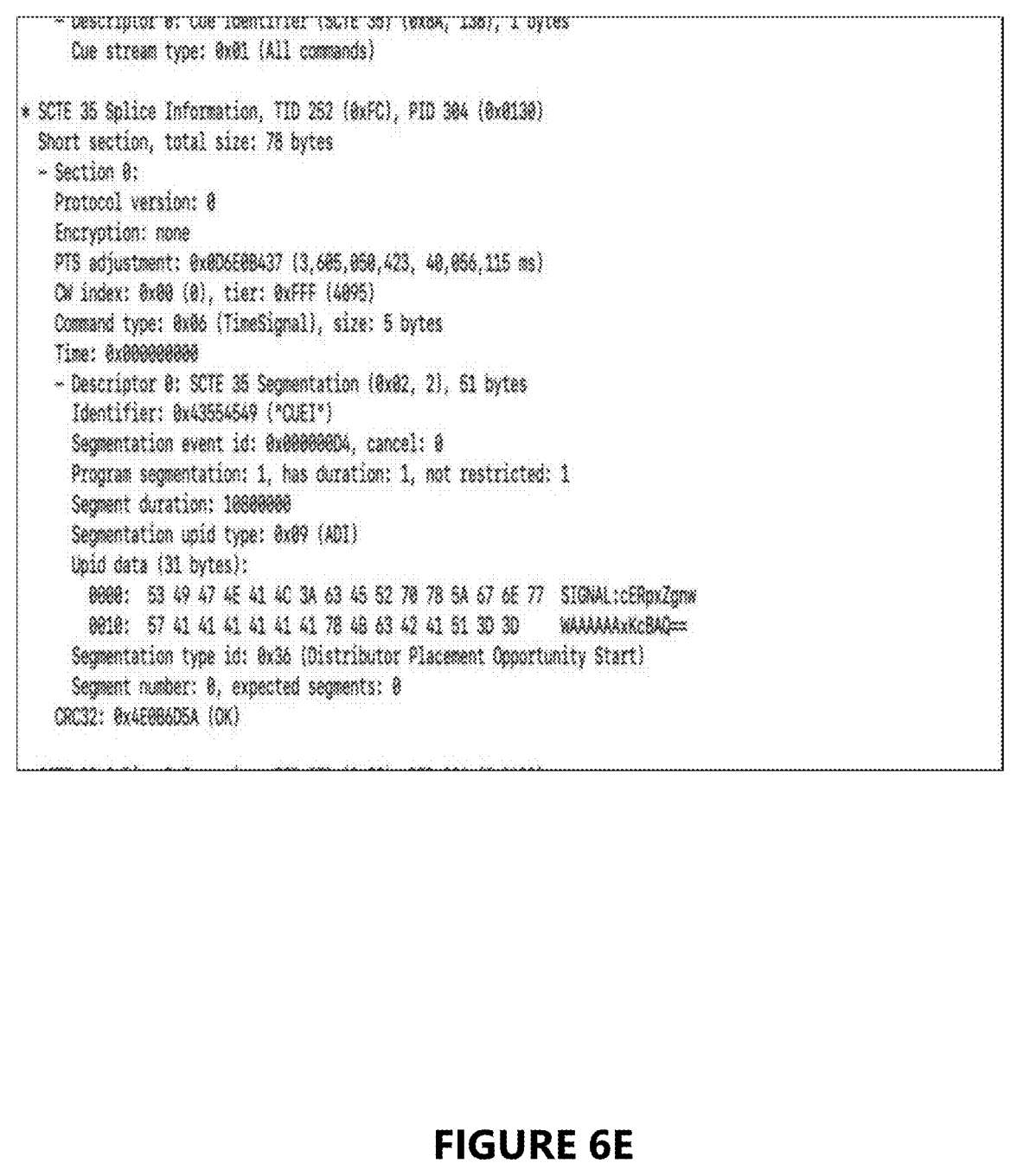

```
    - Descriptor 0: Cue Identifier (SCTE 35) (0x8A, 138), 1 bytes
      Cue stream type: 0x01 (All commands)

* SCTE 35 Splice Information, TID 252 (0xFC), PID 304 (0x0130)
  Short section, total size: 78 bytes
  - Section 0:
    Protocol version: 0
    Encryption: none
    PTS adjustment: 0x0D6E08437 (3,605,050,423, 40,056,115 ms)
    CW index: 0x00 (0), tier: 0xFFF (4095)
    Command type: 0x06 (TimeSignal), size: 5 bytes
    Time: 0x00000000
    - Descriptor 0: SCTE 35 Segmentation (0x02, 2), 61 bytes
      Identifier: 0x43554549 ("CUEI")
      Segmentation event id: 0x000000D4, cancel: 0
      Program segmentation: 1, has duration: 1, not restricted: 1
      Segment duration: 10800000
      Segmentation upid type: 0x09 (ADI)
      Upid data (31 bytes):
        0000:  53 49 47 4E 41 4C 3A 63 45 52 70 78 5A 67 6E 77  SIGNAL:cERpxZgnw
        0010:  57 41 41 41 41 41 41 78 48 63 42 41 51 3D 3D     WAAAAAAxHcBAQ==
      Segmentation type id: 0x36 (Distributor Placement Opportunity Start)
      Segment number: 0, expected segments: 0
    CRC32: 0x4E086D5A (OK)
```

FIGURE 6E

DYNAMIC SPLICE POINT ADJUSTMENT FOR VIDEO SIGNALS

CROSS REFERENCE TO RELATED APPLICATION

This application is a continuation of U.S. patent application Ser. No. 18/236,084, filed Aug. 21, 2023, 2016, now U.S. Pat. No. 12,177,536, issued Dec. 24, 2024, which is a continuation of application Ser. No. 17/722,984, filed Apr. 18, 2022, now U.S. Pat. No. 11,736,781, issued Aug. 22, 2023, which applications are incorporated herein by reference in their entirety.

BACKGROUND

Video production equipment is used to process video signals or streams into manageable formats in efforts to provide a distribution of video with high quality to end-user equipment. However, suboptimal processing of video streams may lead to unwanted video artifacts arising in downstream equipment. In some cases, inherent graphical processing and memory limitations associated with certain types of video production equipment may not be apparent until unwanted visual artifacts emerge when displaying a video stream after processing with the video production equipment. The technical problem of removing or reducing visual artifacts, which may be attributed to, packet communication errors, processing latency, timing misalignments and overcompensation, non-synchronous alignment of insertion boundaries, etc. is a burden that video providers attempt to resolve in order to provide quality video to end-user equipment.

Video signal processing standards exist that may be integrated with the video production equipment in attempting to provide high quality video to end-user equipment. For example, the Society of Cable Telecommunications Engineers (SCTE) SCTE-35 standard supports delivery of events, frame accurate or non-frame accurate, associated descriptive data, etc. for Moving Picture Experts Group (MPEG) transport streams. The SCTE-35 standard supports the use of splicers to splice content into a transport stream for the purpose of Digital Program Insertion, which includes advertisement insertion and insertion of other content types.

The SCTE-35 standard provides an in-stream messaging mechanism for signal splicing and insertion opportunities. The SCTE-35 standard enables a notification to downstream devices of upcoming splice points and other timing information in a transport stream in the form of a splice information table. For example, SCTE-35 messages contain a presentation timestamp (pts) value of the video frame that corresponds with an intended splice point which informs a splicer of when to splice streams or content. However, a technical solution is needed to compensate for situations when an adjustment value associated with a splice point location is inaccurate. Inaccurate adjustment values may result in unwanted downstream ripple effects that may adversely affect transcoders, secondary content servers, splicers, end-user equipment, etc. when processing the video signals and/or inserting secondary content. As described herein, a technical solution is provided to compensate for inaccurate splice point locations and/or associated adjustment values when processing video signals.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure provide for systems, methods, computer readable media, server machines, and video processing equipment for reducing visual artifacts and providing robust video signals to end-user equipment, but is not so limited. As described below, aspects of the disclosure provide a technical solution associated with the processing of video that reduces or eliminates visual transition artifacts at improperly aligned content boundaries, but are not so limited. According to an aspect, a server machine includes a splice point controller that is configured to analyze video to detect and compensate for content boundary misalignments. The splice point controller is configured to account for inaccuracies that may arise when processing video streams by analyzing splice point parameters and/or dynamically updating adjustment values associated with splice points to ensure appropriate transitions from primary content to secondary content (also referred to as alternate content). After determining an adjustment value for a splice point, the splice point controller is configured to provide feedback in the form of a first offset value to a signal processing engine, which provides the first offset value to a transcoder farm or a transcoder. The splice point controller is also configured to provide feedback in the form of a second offset value to a secondary content source or server as part of synchronizing the outputs of the transcoder farm and/or secondary content source and reducing artifacts associated with processing of video. Accordingly, aspects of the disclosure enable provision of splice point adjustment recommendations to signal processing engines, transcoders, and/or secondary content sources for splice point parameters (e.g., SCTE35 descriptors) and the corresponding splice points.

In one aspect, a system includes a splice point controller that is configured to monitor a video signal input to and output from a video splicer that operates to splice secondary content with primary content. According to an aspect, the splice point controller executes a splice point adjustment algorithm to determine whether to dynamically adjust an adjustment value associated with a location of a splice point of a video signal. Splice point controller uses the splice point adjustment algorithm in part to determine whether a splice point adjustment is needed and/or to update or determine a proper location of a splice point if warranted. Splice point controller is configured to analyze a video stream, such as a transport stream provided by a primary content source, and determine whether to adjust one or more adjustment values associated with one or more locations of one or more splice points as part of preventing or reducing visual artifacts that may occur when splice points are inaccurately located or when inherent processing or communication delays affect content boundary alignments. By adjusting an adjustment value associated with a location of a splice point, splice point controller can mitigate downstream ripple effects that may adversely affect transcoder operations, secondary content or server operations, groomer/splicer operations, end-user equipment operations, etc. For example, splice point controller can be configured to align a splice point adjustment value (e.g., pts_adjustment value) associated with an SCTE-35 descriptor with an actual live splice point time that is included with a live broadcast.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIGS. 6A-6E depict an example of dynamically adjusting splice point locations and providing feedback signals with adjustment parameters according to an aspect;

DETAILED DESCRIPTION

Figure 1:
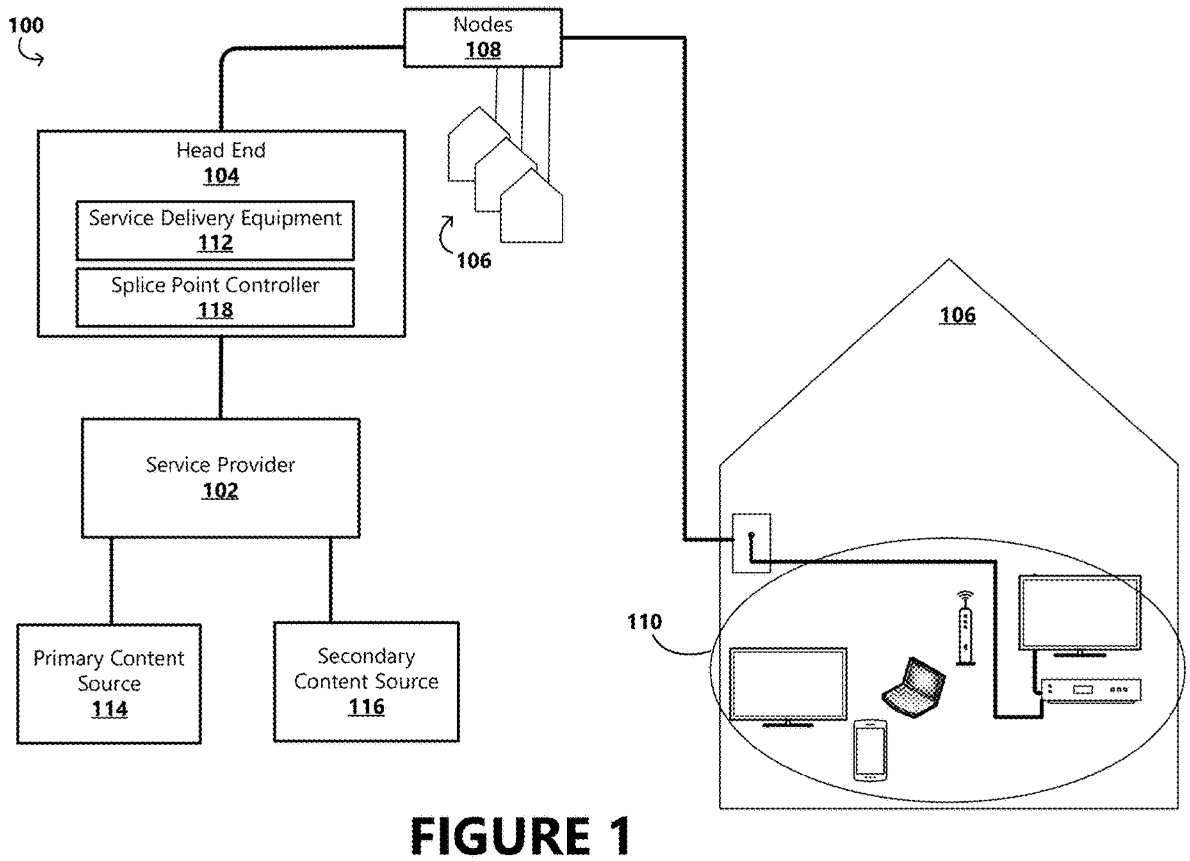
FIG. 1 is a block diagram of an example communication environment in which aspects of the present disclosure can be implemented.

Aspects of the present disclosure provide for systems, methods, computer readable media, server machines, and video processing equipment for reducing visual artifacts and providing robust video signals to end-user equipment, but is not so limited. As described below, aspects of the disclosure provide a technical solution associated with the processing of video that reduces or eliminates visual transition artifacts at improperly aligned content boundaries, but are not so limited. According to an aspect, a server machine supports a splice point controller that is configured to analyze video to detect and compensate for content boundary misalignments. According to an aspect, the splice point controller is configured to capture and sample a duration of live video content at certain times without having to monitor a live broadcast continuously. For example, splice point controller can operate to capture snapshots/samples of a live broadcast at regular intervals such as capturing t minutes (e.g., 5 minutes) of content every hour as part of determining whether to adjust a splice point location. The splice point controller is configured to account for inaccuracies that may arise when processing video streams by analyzing splice point parameters and/or dynamically updating adjustment values associated with splice points to ensure appropriate transitions from primary content to secondary content. After determining an adjustment value associated with a splice point, the splice point controller is configured to provide feedback in the form of a first offset value to a signal processing engine, which provides the first offset value to a transcoder farm or transcoder. The splice point controller is also configured to provide feedback in the form of a second offset value to a secondary content source or server as part of synchronizing the outputs of the transcoder farm and/or secondary content source and reducing artifacts associated with processing of video. Feedback provided by splice point controller may occur each time an adjustment is made to a splice point adjustment value (e.g., pts_adjustment value).

As described below, a splice point controller is configured to determine whether a splice point adjustment is needed and/or to update an adjustment value associated with a location of a splice point if warranted. Splice point controller is configured to analyze video streams to determine whether to adjust splice point parameters as part of preventing or reducing visual artifacts that may occur due to inaccurate or misaligned splice points. By adjusting an adjustment value associated with a location of a splice point, splice point controller can operate to mitigate a downstream ripple effect caused by inaccurate splice points that may adversely affect transcoder operations, ad server operations, groomer/splicer operations, end-user equipment operations, etc.

According to an aspect, splice point controller dynamically determines adjustment values associated with inaccurate splice point adjustment values (e.g., SCTE 35 pts_adjustment) to mitigate adverse downstream ripple effects on transcoders, secondary content servers, groomers or splicers, etc. due in part to inaccurate splice point parameters. According to one aspect, splice point controller evaluates a splice point of a video stream relative to a nearest I frame or DR frame, nearest black frame, and/or nearest scene change value and adjusts an adjustment value of the splice point so that the splice point aligns with an I frame or IDR frame. A time adjustment associated with an adjustment value may be applied to additional splice points of the video signal and is not limited to a current splice point being analyzed. Accordingly, splice point controller is able to compensate for misalignments between a splice point and an SCTE-35 pts_adjustment value to prevent downstream discrepancies due to misalignments. Splice point controller is configured to provide feedback, in the form of offset values, to be communicated to a transcoder farm and/or secondary content source(s). Splice point controller is configured to dynamically process and update splice point adjustment values across multiple live video streams concurrently or according to a defined schedule. Splice point controller is configured to analyze each live broadcast stream or channel to provide splice point adjustments tailored for each live broadcast stream or channel. For example, the splice point controller is able to monitor each live broadcast stream or channel over time to determine whether splice point adjustments are warranted and, if warranted, dynamically update splice point parameters for each splice point.

The splice point controller of one aspect dynamically determines and provides a splice point adjustment value to compensate for a misalignment between an SCTE-35 trigger and a secondary content insertion boundary. Splice point controller provides a technical solution to mitigate content transition misalignments that cause downstream systems to insert secondary content a few frames earlier or later than an accurate or proper secondary content insertion boundary (e.g., an advertisement boundary). The splice point controller is configured to dynamically update splice point parameters, including splice point adjustment values, to reduce or prevent visual artifacts from occurring, such as cutting off the tail end of a previous advertisement or displaying frames of an underlying advertisement before insertion of a dynamic advertisement for example.

FIG. 1 is a block diagram of an example communication environment 100 in which aspects of the present disclosure can be implemented. As shown in FIG. 1, example environment 100 includes a service provider 102 that utilizes various delivery equipment to provide video, internet, telephony, and/or other services to end-users. For example, service provider 102 can utilize headend 104 to deliver live video to premises 106 (e.g., residential, business, etc.) via one or more network nodes 108. Premises 106 may include different types and numbers of end-user equipment 110 for use by end-users, such as set-top boxes, modems, routers, single device modems/routers, smart televisions, smartphones, laptop computers, desktop computers, tablet computers, etc.

As an example, service provider 102 may utilize a network via a hybrid fiber coax (HFC) or fiber (see example of FIG. 8) communication infrastructure to provide cable television, internet, and/or other services to end-users via a junction at premises 106 that may include one or more filters, amplifiers, splitters, coaxial, fiber, etc. enabling signals to be communicated to and from premises 106 to access services provided by service provider 102. Service provider 102 may provide services via the communication infrastructure to a junction at premises 106 according to a standardized communication protocol. The standardized communication protocol according to which service provider 102 operates may define upstream and downstream channels to enable bidirectional communications between service provider 102 and a plurality of end-users.

Headend 104 includes services delivery equipment 112 to facilitate the provision of various services to end-users. For example, headend 104 can include a cable modem termination system (CMTS) to provide high speed data services such as cable, internet, voice, data, etc. to end-users. A data over cable service interface specification (DOCSIS) standard may be utilized for exchanging data between the CMTS and end-user equipment 110. For example, CMTS may encode, modulate, and upconvert one or more services onto radio frequency (RF) carriers, combine the RF carriers into a single electrical signal, and provide the electrical signal to a broadband optical transmitter. The broadband optical transmitter may convert the electrical signal to a downstream optically modulated signal that is sent to one or more network nodes 108 over one or more fiber optic cable lines or other signal conveying infrastructure. Headend 104 may include an optical line terminal (OLT) to provide the services to end-user equipment 110 over a passive optical network (PON) that utilizes a PON standard for exchanging data between the OLT and end-user equipment 110.

Service provider 102 and/or headend 104 is in communication with one or more primary content sources 114 (e.g., ESPN, CNN, FOX, ABC, NBC, etc.) and/or one or more secondary content sources 116. According to one example, a secondary content source 116 comprises an advertisement server (e.g., managed by service provider 102 or a third party) that serves advertisements for splicing into a primary content feed. As described further below in reference to FIG. 2, and according to an aspect, headend 104 includes a splice point controller 118 (also referred to as eavesdropper) that operates in part to determine whether a splice point adjustment is needed and/or to update and/or determine an adjustment value associated with a proper location of a splice point if warranted.

Splice point controller 118 is configured to analyze a video stream, such as a transport stream, and determine whether to adjust splice point parameters as part of preventing or reducing visual artifacts that may occur when a splice point is not accurately located. By adjusting splice point parameters, splice point controller 118 may be able to mitigate a downstream ripple effect caused by inaccurate splice point parameters that may adversely affect transcoder operations, advertisement server operations, groomer/splicer operations, end-user equipment operations, etc.

Splice point controller 118 is also configured to assist with delivery of video to legacy equipment, such as such as QAMs and digital (e.g., HLS/MPEG-DASH) packagers concurrently. According to an aspect, splice point controller 118 can determine a pts_adjustment value for a live broadcast to not adversely impact other types of end-user equipment 110 (e.g., DASH/HLS endpoints). For example, DASH/HLS consumer endpoints receive a live broadcast feed from a content delivery network (CDN) which obtains .ts files from a DASH/HLS packager that receives the content feed from a transcoder (e.g., transcoder farm 204 of FIG. 2). Even though a content feed may not be fed through a splicer or groomer, splice point controller 118 can be configured to determine a splice point adjustment value that minimizes artifacts on both types of endpoints (i.e., legacy QAMs served by a splicer and streaming endpoints, such as, DASH/HLS).

Figure 2:
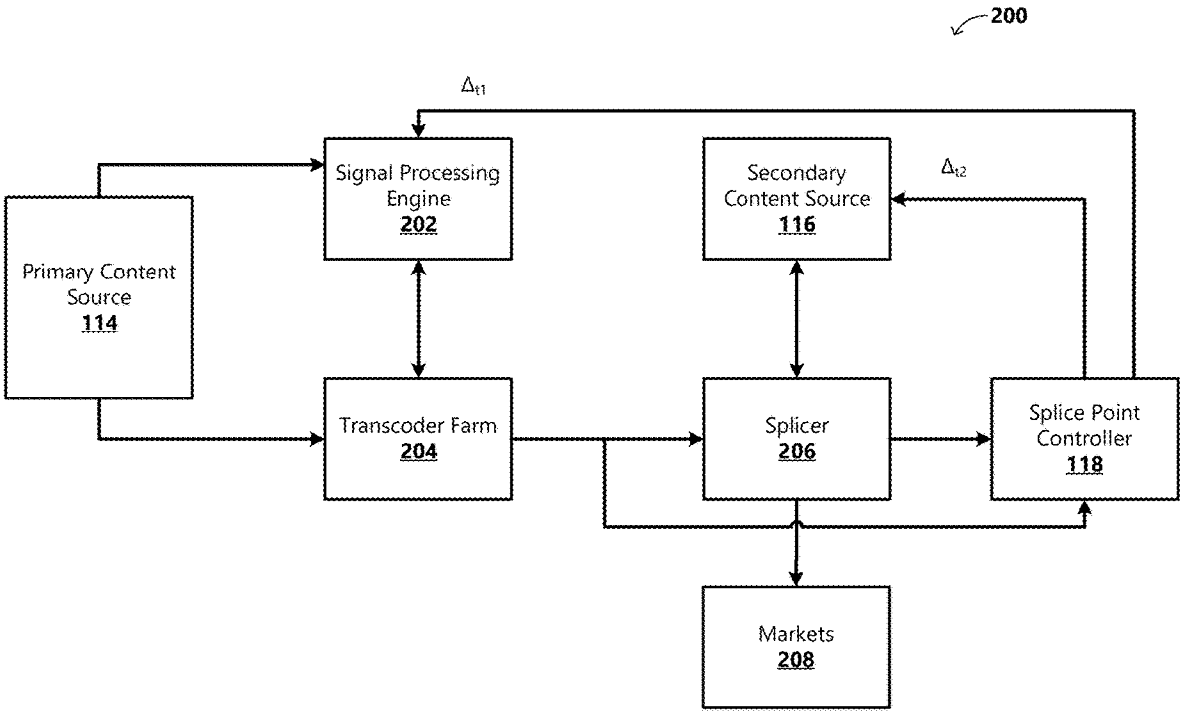
FIG. 2 is a block diagram of a system configured to prevent or reduce visual artifacts when delivering video content to end-users according to an aspect.

FIG. 2 is a block diagram of a system 200 of an aspect configured to prevent or reduce visual artifacts, such as black screens or frozen screens for example, associated with inaccurate splicing information when delivering video content to end-users, but is not so limited. As shown in FIG. 2, system 200 includes a signal processing engine (SPE) 202 in communication with a transcoder farm 204 that includes a plurality of transcoders for processing and compressing input video signals. SPE 202 and transcoder farm 204 are in communication with primary content source 114. Transcoder farm 204 is in communication with a splicer or groomer 206. The splicer 206 is in communication with secondary content source 116 and splice point controller 118.

According to an aspect, headend 104 includes one or more server machines facilitating the operation of SPE 202, transcoder farm 204, splicer 206, and/or splice point controller 118, but is not so limited. In one aspect, splice point controller 118 resides and executes on a dedicated server machine at headend 104. An exemplary splicer 206 can be obtained from COMMSCOPE, model CAP-1000. Splicer 106 of one aspect is configured to mix an encoded SCTE-35 cue with a transport stream (TS) stream (e.g., primary content) with a unique packet identifier (PID) so that end-user equipment 110 can access secondary content designated by the unique PID (e.g., a targeted advertisement) to render a substantially seamless transition for an end user. The SCTE-35 cue or descriptor provides an indication to end-user equipment to retrieve or request secondary or alternate content (e.g., minimum of 4 seconds is recommended to ensure that the alternate content is spliced in properly).

According to an aspect, SPE 202 can be embodied as a software application, module, or computing device operative or configured to receive SCTE-224 information or resident policies from primary content source 114. The SCTE-224 information provides an event signaling notification interface (ESNI) defining transmission of event and policy information. For example, one or more policies can be applied based on occurrence of a corresponding event. An event may be schedule-based, signal-based, or time-based and includes different types of messages (i.e., media or channel message, media points representative of events message, policy message such as a viewing policy for example, audience type message).

The resident policies received by SPE 202 define how to process incoming video signals from a primary content source or sources. For example, SPE 202 may apply a resident policy to a national network feed, such as updating or modifying parameters associated with an SCTE-35 descriptor. As described above, the SCTE-35 descriptor supports the splicing of content for the purpose of Digital Program Insertion, which includes advertisement insertion and insertion of other content types, defining an in-stream messaging mechanism for signal splicing and insertion opportunities.

According to an aspect, transcoder farm 204 includes a plurality of transcoders where each transcoder can be embodied as a software application, module, or computing device operative or configured to process and/or compress received video signals. According to one aspect, transcoder farm 204 is configured to receive a transport stream (e.g., Digital Video Broadcasting (DVB) second generation (S2) with SCTE-35 descriptor or uncompressed video and SCTE-104 information) from primary content source 114 for processing and compressing into a compressed video format. DVBS2 is a broadcasting standard intended to support internet audio-video streaming which provides a different type of transport mechanism as compared to MPEG-2 transport packets but is backward compatible with MPEG-2. An MPEG-2 transport stream may carry an MPEG-2 payload or audio-video MPEG-4 payload. According to one example, transcoder farm 204 operates to compress an input transport stream into MPEG-4 transported through MPEG-2 packets (referred to as "mp2ts").

Upon receiving a transport stream, transcoder farm 204 passes an Event Signaling and Management (ESAM) message to SPE 202. In response, SPE 202 may update the SCTE-35 descriptor with resident policies or SCTE-224 media stream/media points specifications and return the SCTE-35 descriptor, including updates, to transcoder farm 204. After receiving a response from SPE 202, transcoder farm 204 compresses the received transport stream into a compressed format (e.g., mp2ts). The transcoder farm 204 outputs a compressed transport stream that includes the SCTE-35 descriptor to splicer 206.

In response to receiving the compressed transport stream from transcoder farm 204, splicer 206 queries secondary content source 116 (e.g., an SCTE-130 Ad Query Request) for secondary content (e.g., an advertisement) to place at an insertion point in the primary content. Secondary content source 116 sends a response to splicer 206 for the SCTE-130 Ad Query Request. Splicer 206 uses timing information provided via an SCTE-35 descriptor for secondary content insertion purposes at headend 104. Splicer 206 also outputs information to markets 208. For example, splicer 206 can multicast the live stream at the (S, G) for downstream equipment, such as QAMs and other streaming devices for example, to join and process for end-user equipment 110 being served. "S" of (S, G) refers to a source IP address and "G" refers to a multicast IP address of a group whose hosts are to receive content, such as live broadcast content for example.

Splicer 206 and splice point controller 118 join the group G (multicast IP) whose source S (transcoder IP address) will multicast a live broadcast for example to the group. Another (S, G) is associated with the output of splicer 206. QAM devices and splice point controller 118 can join the group multicast IP that is sourced by splicer 206 (S). Splice point controller 118 can operate to determine a splice point adjustment value by comparing the respective (S,G)s multicast of transcoder farm 204 and splicer 206 for each channel/stream. For example, 1) splice point controller 118 can issue an Internet Group Management Protocol (IGMP) report to a "last hop" (LH) router (relative to a source network tree for any multicast group G that it is interested in joining); 2) the LH router sends a Protocol Independent Multicast (PIM) (*, G) to a central router to discover the source multicast; and 3) the LH router discovers the source multicast and is able to join the shortest-path tree (SPT). Splice point controller 118 and any host-listener interested in a particular group (G) is then able to receive multicast traffic from the corresponding source.

Splice point controller 118 is configured to analyze the video signal input to splicer 206 (or output from transcoder farm 204) and the video signal output from splicer 206 as part of aligning a splice point adjustment value (e.g., pts_adjustment value) associated with an SCTE-35 descriptor with an actual live splice point time that is included as part of a live program broadcast. According to an aspect, splice point controller 118 taps into the communication path providing the video signal input to splicer 206 and the communication path coupling the splicer 206 with secondary content source 116. According to an aspect, splice point controller 118 monitors the multicast of transcoder farm 204 and splicer 206 for each channel/stream as part of determining and recommending a splice time adjustment.

As described above, splice point controller 118 is configured to determine if splicing information of a video signal is accurate or inaccurate. If the splicing information is inaccurate, splice point controller 118 of one aspect executes a splice point adjustment algorithm that dynamically updates an adjustment value associated with a splice point. According to an aspect, splice point controller 118 runs splice point adjustment algorithm to analyze a defined portion or segment of the output of splicer 206 and a defined portion or segment of the input to splicer 206 as received from transcoder farm 204. To determine an accurate frame to associate with the splice point, splice point adjustment algorithm identifies a nearest frame that satisfies splice point adjustment conditions.

According to one aspect, splice point adjustment conditions correspond to a nearest frame, relative to a frame associated with an original splice point or adjustment value, that satisfies one of: an I frame and a black frame; an I frame and a scene change value or score that is greater than a predetermined adjustable threshold; or a black frame and a scene change value or score that is greater than a predetermined adjustable threshold. For MPEG 4 streams, a nearest frame should satisfy one of: an DR frame and a black frame; an DR frame and a scene change value or score that is greater than a predetermined adjustable threshold; or a black frame and a scene change value or score that is greater than a predetermined adjustable threshold.

Figure 3:
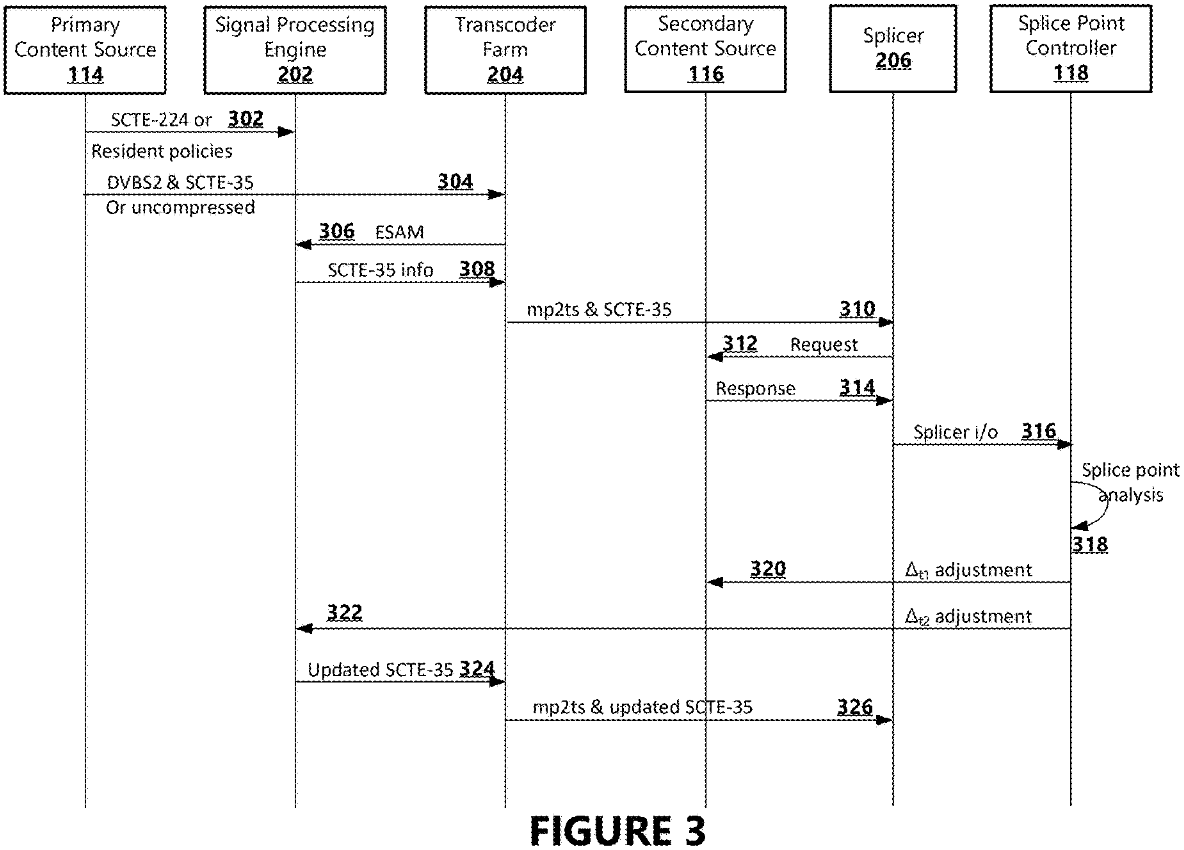
FIG. 3 is a high-level communication diagram of a system configured to evaluate and/or update splice point information according to an aspect.

FIG. 3 is a high-level communication diagram of system 200 configured to evaluate and/or update splice point information associated with a video signal according to an aspect. At 302, primary content source 114 provides SCTE-224 or resident policies to SPE 202. At 304, primary content source 114 provides a transport stream of a first video format to transcoder farm 204. For example, primary content source 114 provides DVBS-2 with SCTE-35 information or uncompressed video to transcoder farm 204. According to one aspect, primary content source 114 provides communications 302 and 304 simultaneously or near simultaneously.

At 306, transcoder farm 204 provides an ESAM communication to SPE 202. In response, SPE 202 at 308 provides an SCTE-35 descriptor, which may include updated adjustment parameters, to transcoder farm 204. At 310, transcoder farm 204, compresses the transport stream to provide a compressed video signal that includes one or more SCTE-35 descriptors to splicer 206. For example, transcoder farm 204 compresses transport stream from a first video format e.g., (MPEG 4) to a second video format (e.g., MPEG 2 or mp2ts) with SCTE-35 descriptors.

At 312, splicer 206 sends a request to secondary content source 116 for secondary content and/or secondary content placement parameters. For example, splicer 206 can send an SCTE-130 request to secondary content source 116. In response, at 314, secondary content source 116 responds to splicer 206 with secondary content and/or the secondary content placement parameters. For example, secondary content source 116 can respond to splicer 206 with an SCTE-30 response that includes secondary content placement parameters. At 316, splice point controller 118 evaluates input to (e.g., defined portions) and output (e.g., defined portions) from splicer 206 or some other component as part of analyzing a video signal. For example, splice point controller 118 may evaluate a certain portion (e.g., 1-5 minute slices) of the input to splicer 206 as output from transcoder farm 204 and/or evaluate a certain portion (e.g., 1-5 minute slices) of the output of splicer 206. According to aspects, splice point controller 118 can be configured to sample live content periodically at defined intervals or times or continuously as live content is received and/or provided.

At 318, splice point controller 118 executes a splice point adjustment algorithm to determine whether a splice point requires adjustment. Splice point controller 118 is configured to analyze one or many splice points that may be included with a content stream. For example, splice point controller 118 may run a service comprising the splice point adjustment algorithm to determine an offset value that needs to be applied by transcoder farm 204 to adjust the splice point and/or determine an offset value that needs to be applied by secondary content source 116. At 320, splice point controller 118 can run the splice point adjustment algorithm to provide a first offset value to SPE 202. At 322, splice point controller 118 can run the splice point adjustment algorithm to provide a second offset value to secondary content source 116. According to an aspect, splice point controller 118 provides the first and second offset values simultaneously or near simultaneously. At 324, SPE 202 provides updated splice point information to transcoder farm 204. For example, SPE 202 can send an SCTE-35 descriptor with updated splice point adjustment parameters to transcoder farm 204. At 326, transcoder farm 204 provides a compressed transport stream to splicer 206 that includes updated splice point parameters, such as an adjustment value associated with a splice point. For example, transcoder farm 204 provides a compressed transport stream to splicer 206 with updated SCTE-35 parameters resulting from execution of the splice point adjustment algorithm.

Figure 4:
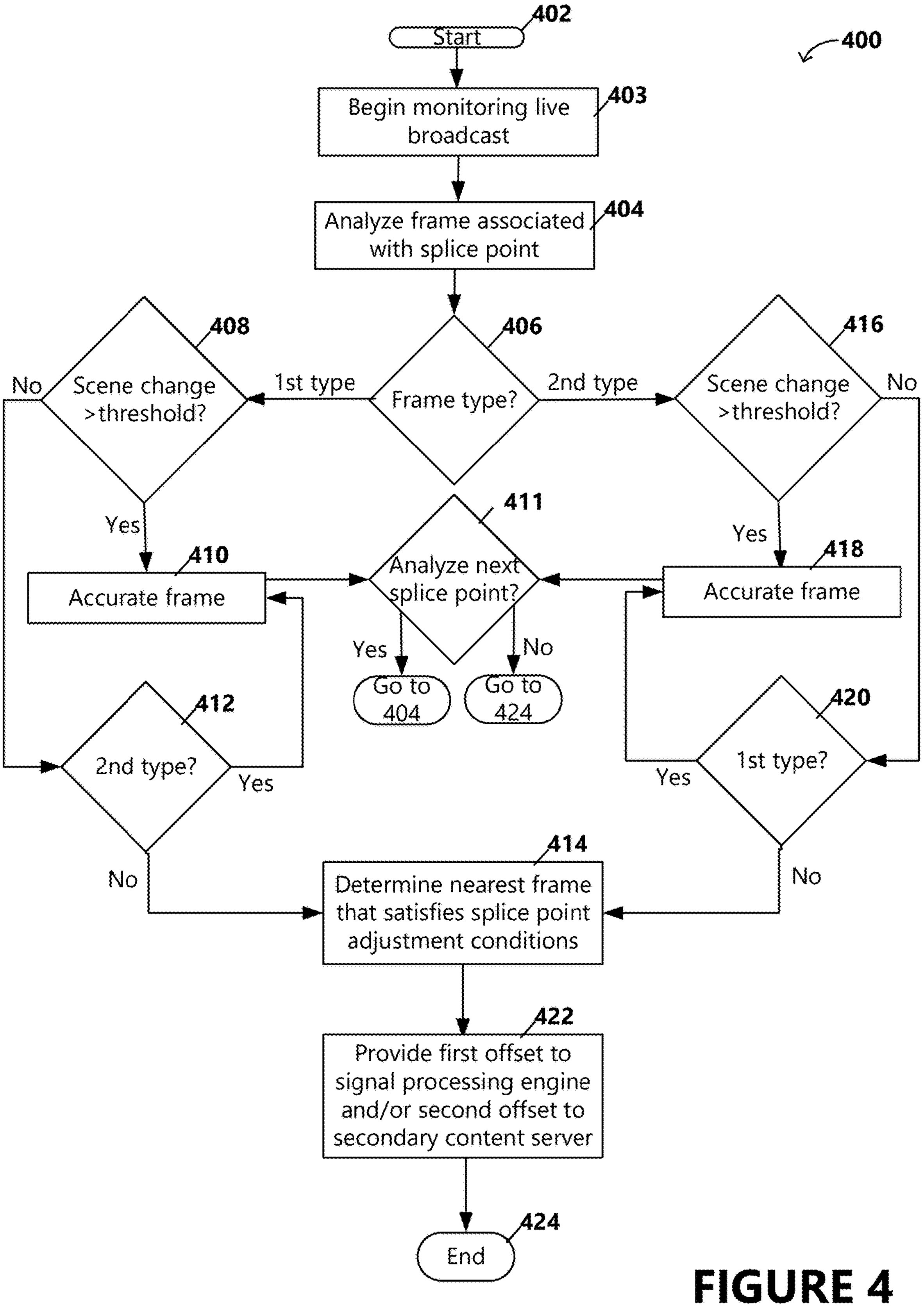
FIG. 4 is a flow diagram depicting an exemplary method of dynamically providing an adjustment to a location of a splice point of a video signal according to an aspect.
Figure 5A:
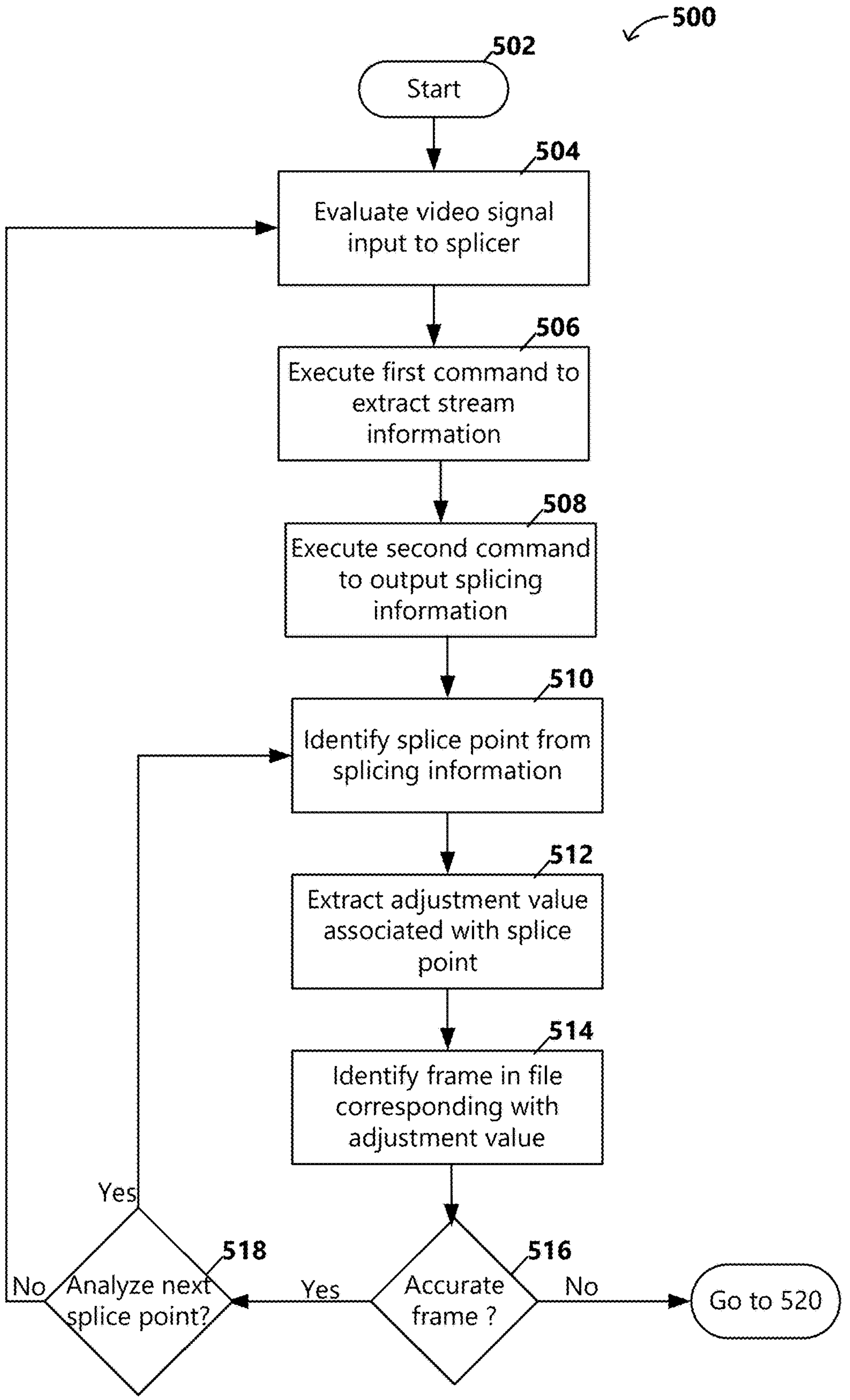
FIGS. 5A-5D are flow diagrams depicting an exemplary method of dynamically adjusting a location of a splice point that is associated with a video signal.
Figure 5B:
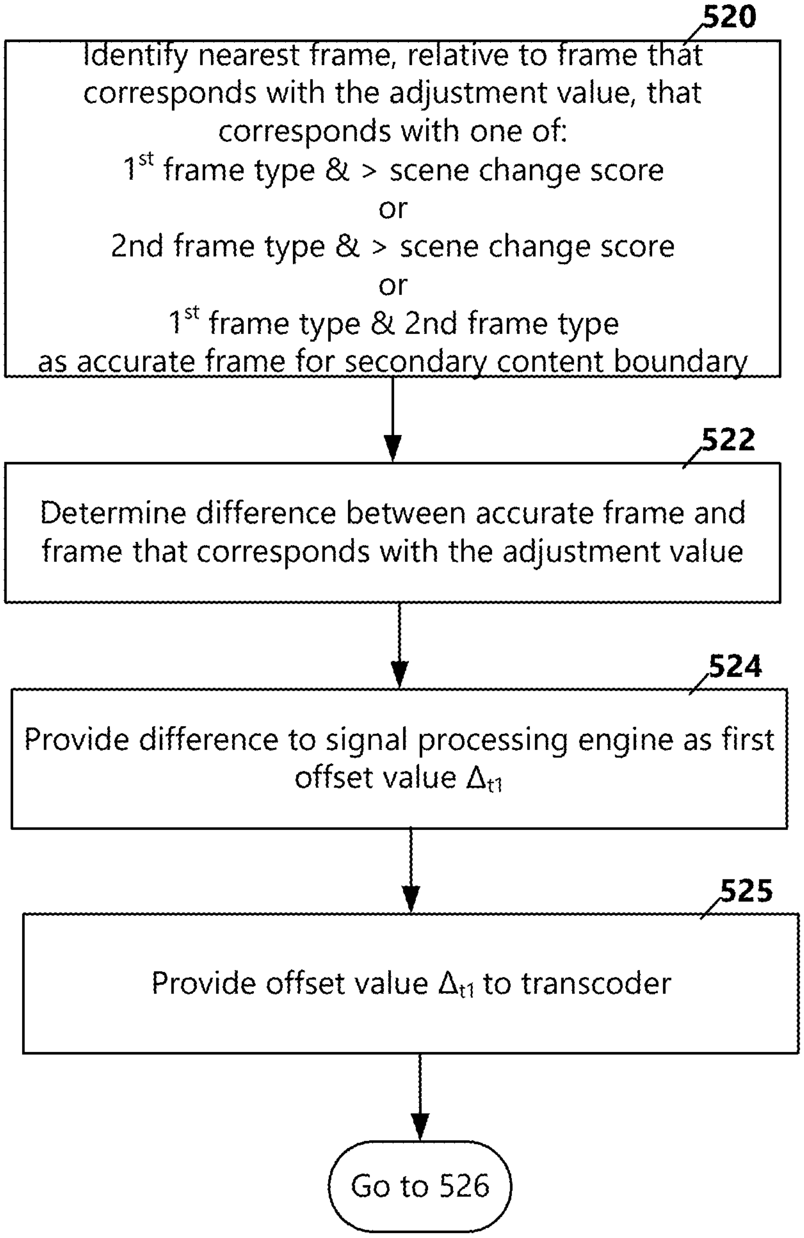
Figure 5C:
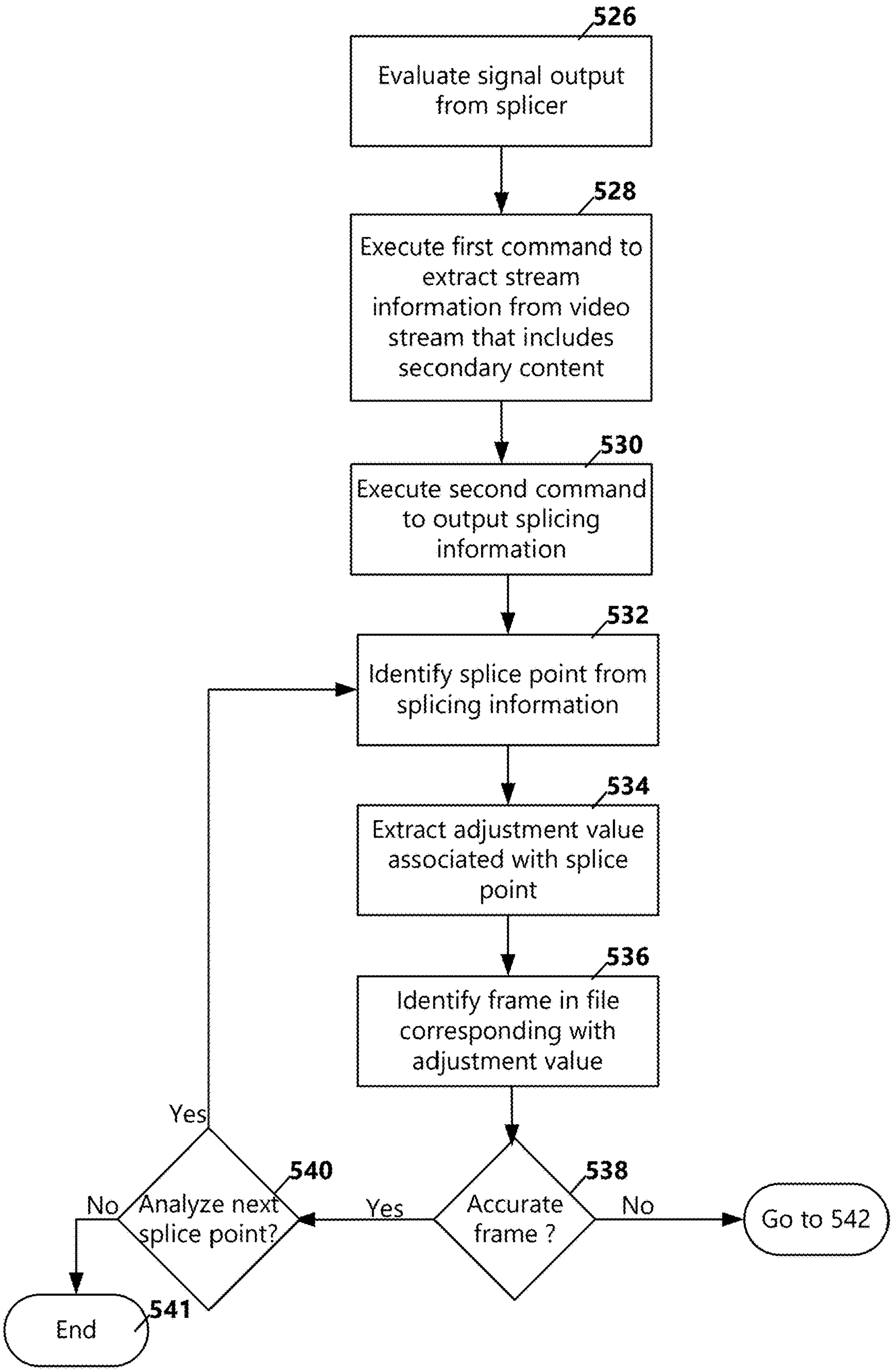
Figure 5D:
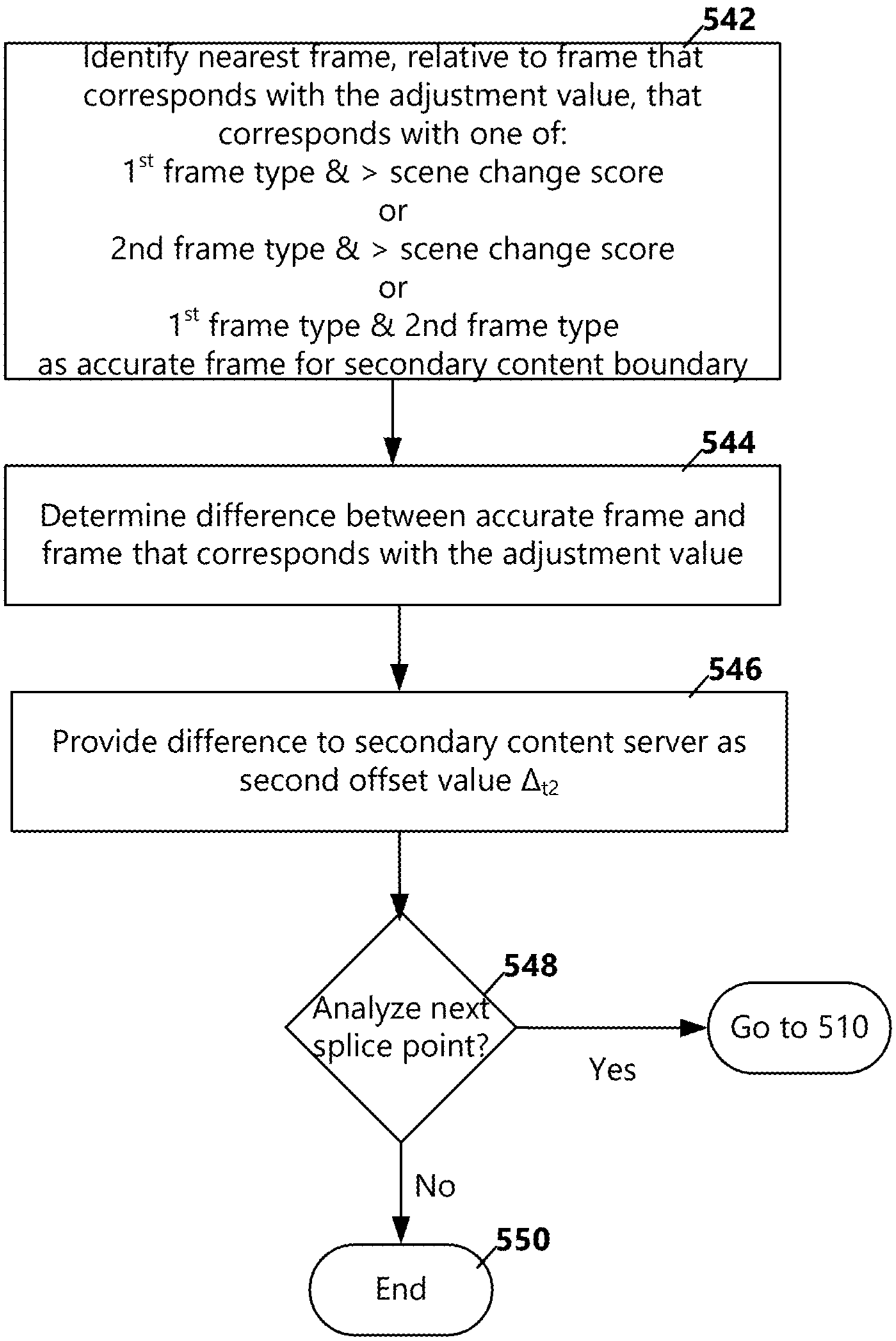

FIG. 4 is a flow diagram depicting an exemplary method 400 of using a splice point adjustment algorithm to dynamically adjust an adjustment value associated with a location of a splice point of a video signal according to an aspect. Method 400 begins at 402 and proceeds to 403 where splice point controller begins monitoring a multicast live broadcast output from transcoder farm 204 and the multicast live broadcast output from splicer 206 for an associated channel delivering a video signal. According to an aspect, at 403 splicer 206 and splice point controller 118 join the group G (multicast IP) whose source S (transcoder IP address) will multicast a live broadcast for example to the group. Another (S, G) is associated with the output of splicer 206. For example, QAM devices and splice point controller 118 can join the group multicast IP that is sourced by splicer 206 (S). Splice point controller 118 can operate to determine a splice point adjustment value by comparing the respective (S,G)s multicast of transcoder farm 204 and splicer 206 for each channel/stream. For example, splice point controller 118 can be configured to monitor signals input to and output from splicer 206 to capture content for a certain time period (e.g., t minutes every hour) for each channel/stream. Method 400 then proceeds to 404 to analyze a frame associated with a splice point. For example, method 400 at 404 can operate to extract splice point information from an SCTE-35 descriptor as part of identifying a frame that is associated with a splice point of the video signal (see the example of FIGS. 6B and 6C).

At 406, method 400 makes a determination as to the frame type of the frame that is associated with the splice point. If the frame is a first type of frame, at 406, method 400 determines at 408 whether a scene change value is greater than a predetermined adjustable threshold value. For example, method 400 can determine that the frame associated with the splice point is an I frame or an IDR frame and the scene change value is greater than a threshold of 0.05. If the frame is the first type of frame at 406 and the scene change value is greater than the predetermined adjustable threshold value, method 400 determines that the frame is accurate at 410 and proceeds to 411 to analyze a next splice point, returning to 404. If there is no next splice point to analyze at 411, method 400 ends at 424.

If the frame is the first type of frame at 406 but the scene change value is not greater than the predetermined adjustable threshold value, method 400 proceeds to 412 to determine if the frame corresponds with a second type of frame. For example, method 400 can determine that the frame associated with the splice point is an I frame or IDR frame type and a black frame type. In one aspect, the first type of frame is an I frame or IDR frame and the second type of frame is a black frame. If the frame corresponds with the first type of frame and the second type of frame, method 400 determines that the frame is accurate at 410 and proceeds to 411 to analyze a next splice point, returning to 404. If there is no next splice point to analyze, method 400 ends at 424.

If the frame corresponds with the first type of frame but not with the second type of frame at 412, method 400 proceeds to 414 to determine a nearest frame that satisfies splice point adjustment conditions. Once the nearest frame that satisfies splice point adjustment conditions is determined at 414, method 400 proceeds to 422 and provides a first offset value to SPE 202 and/or a second offset value to secondary content source 116. SPE 202 operates to provide the first offset value to transcoder farm 204. Thereafter, transcoder farm 204 uses the first offset value for location of the associated splice point and secondary content source 116 uses the second offset value when serving secondary content to splicer 206. According to one aspect, splice point controller 118 is configured to provide the first offset value to transcoder farm 204.

If the frame is a second type of frame, at 406, method 400 determines at 416 whether a scene change value is greater than a predetermined adjustable threshold value. For example, method 400 can determine that the frame associated with the splice point is a black frame and the scene change value is greater than a threshold of 0.05. If the frame is the second type of frame at 406 and the scene change value is greater than the predetermined adjustable threshold value, method 400 determines that the frame is accurate at 418 and proceeds to 411 to analyze a next splice point, returning to 404. If there is no next splice point to analyze at 411, method 400 ends at 424.

If the frame is the second type of frame at 406 but the scene change value is not greater than the predetermined adjustable threshold value, method 400 proceeds to 420 to determine if the frame corresponds with the first type of frame. For example, method 400 can determine that the frame associated with the splice point is a black frame type and an I frame type. If the frame corresponds with the second type of frame and the first type of frame, method 400 determines that the frame is accurate at 418 and proceeds to 411 to analyze a next splice point, returning to 404. If there is no next splice point to analyze, method 400 ends at 424.

If the frame corresponds with the second type of frame but not with the first type of frame at 420, method 400 proceeds to 414 to determine a nearest frame that satisfies the splice point adjustment conditions. For example, method 400 can determine a nearest frame that satisfies one of: the first type of frame and a scene change value greater than the scene change value of the frame currently associated with a splice point; the second type of frame and a scene change value greater than the scene change value of the frame currently associated with a splice point; or the first type of frame and the second type of frame.

Once the nearest frame is determined at 414, method 400 proceeds to 422 and provides a first offset value to SPE 202 and/or a second offset value to secondary content source 116. SPE 202 operates to provide the first offset value to transcoder farm 204. Thereafter, transcoder farm 204 uses the first offset value for location of the associated splice point and secondary content source 116 uses the second offset value when serving secondary content or placement parameters to splicer 206. Determination of a nearest frame to locate a splice point according to an aspect is described in conjunction with FIGS. 5A-5D.

FIGS. 5A-5D are flow diagrams depicting an exemplary method 500 that uses a splice point adjustment algorithm to dynamically adjust an adjustment value that is associated with a splice point of a video signal, such as a transport stream received from primary content source 114 according to an aspect. Method 500 begins at 502 and proceeds to 504 where method 500 uses splice point controller 118 to evaluate the video signal or video stream input to slicer 206 from transcoder farm 204. For example, method at 504 can use splice point controller 118 to evaluate a certain portion or time period (e.g., 1-5 minute slices) of the video signal input to splicer 206 from transcoder farm 204.

At 506, method 500 uses splice point controller 118 to execute a first command to extract stream information from the video signal. For example, method 500 at 506 can execute a command (e.g., ffprobe) to extract stream information into an index file (e.g., input index). Ffprobe gathers information from multimedia streams and outputs the information in human and machine-readable form. For example, ffprobe can be executed to check the format of a container used by a multimedia stream and the format and type of each contained media stream, show information about each frame contained in the multimedia stream, etc. According to one aspect, splice point controller 118 first creates a copy (see FIG. 6A) of the original transport stream with frame numbers by executing a command (e.g., ffmpeg) before the first command (e.g., ffprobe). FIG. 6B provides an example input index resulting from execution of the ffprobe command on the input to slicer 206.

At 508, method 500 uses splice point controller 118 to execute a second command to output splicing information associated with the video signal input to splicer 206. For example, method 500 at 508 can execute a command (e.g., tstables) to output splicing information that includes one or more splice point locations and/or any splice point adjustment parameters, such as a timing offset to be used in conjunction with a splice point location (see the example of FIG. 6C). In one aspect, method 500 relies on the SCTE-35 standard as part of evaluating transport streams.

At 510, method 500 uses splice point controller 118 to identify a splice point from the splicing information obtained at 508. At 512, method 500 uses splice point controller 118 to extract an adjustment value associated with the splice point that was identified at 510. At 514, method 500 uses splice point controller 118 to identify a frame in the input index resulting from the execution of the first command at 506 that corresponds with the adjustment value for the splice point being analyzed. At 516, method 500 uses splice point controller 118 to determine whether the identified frame is accurate (see FIG. 4). If method 500 determines that the identified frame is accurate at 516, at 518 method 500 evaluates a next splice point by returning to 510. If there is no next splice point to evaluate, method returns to 504 to analyze a next transport stream.

If method 500 determines that the identified frame associated with the splice point is not accurate at 516, method 500 proceeds to 510 and uses splice point controller 118 to identify a nearest frame, relative to the identified frame associated with the splice point, as an accurate frame that corresponds with one of: the first frame type and a scene change score that is greater than the scene change score of the identified frame; the second frame type and a scene change score that is greater than the scene change score of the identified frame; or the first frame type and the second frame type. For example, a first frame type corresponds with an I frame or an IDR frame and the second frame type corresponds with a black frame.

After identifying a nearest frame that satisfies the splice point adjustment conditions at 520, method 500 proceeds to 522 and uses splice point controller 118 to determine a time difference between the nearest frame and the identified frame associated with the splice point. At 524, method 500 uses splice point controller 118 to provide the time difference to SPE 202 as a first offset value. At 525, method 500 uses SPE 202 to provide the first offset value to transcoder farm 204, before proceeding to 526. According to one aspect, splice point controller 118 is configured to count the number of frames that the identified frame associated with the splice point is from the accurate frame and divide by 59.94 (e.g., 59.94 fps is the standard) to determine the time difference.

Figure 6D:
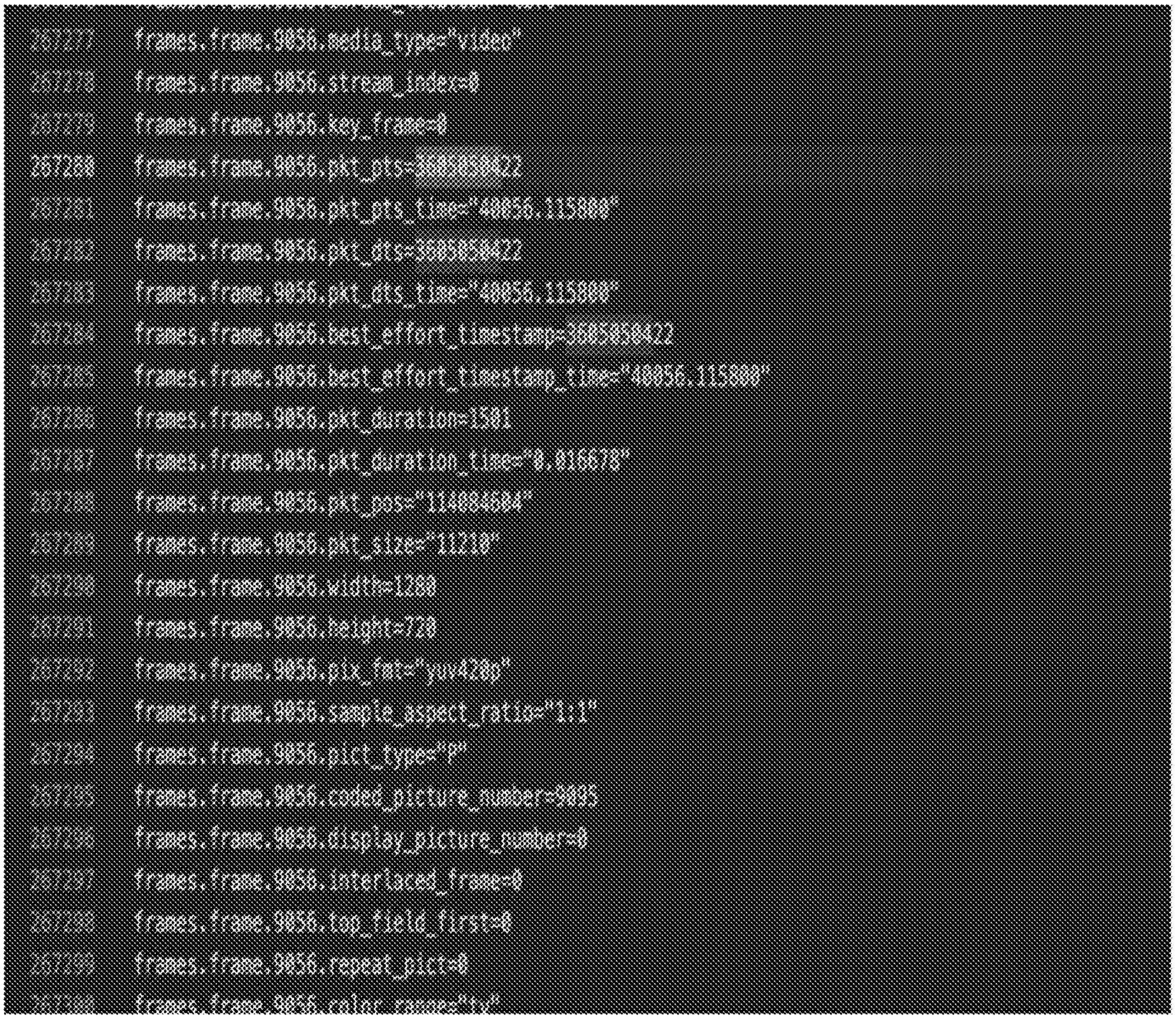

Method 500 continues at 526 to use splice point controller 118 to evaluate the video signal output from slicer 206 that includes secondary content provided by secondary content source 116. For example, method at 526 can use splice point controller 118 to evaluate a certain portion or time period (e.g., 1-5 minute slices) of the video signal output from splicer 206. At 528, method 500 uses splice point controller 118 to execute the first command to extract stream information from the video signal that includes secondary content. For example, method 500 at 528 can execute a command (e.g., ffprobe) to extract stream information into an index file (e.g., output index). FIG. 6D provides an example output index resulting from execution of the ffprobe command on the output of slicer 206.

At 530, method 500 uses splice point controller 118 to execute the second command to output splicing information associated with the video signal output from splicer 206. For example, method 500 at 530 can execute a command (e.g., tstables) to output splicing information that includes one or more splice point locations and/or any splice point adjustment parameters, such as a timing offset to be used in conjunction with a splice point location.

At 532, method 500 uses splice point controller 118 to identify a splice point from the splicing information obtained at 530. At 534, method 500 uses splice point controller 118 to extract an adjustment value associated with the splice point that was identified at 532. At 536, method 500 uses splice point controller 118 to identify a frame in the index file (e.g., output index) resulting from the execution of the first command at 528 that corresponds with the adjustment value for the splice point being analyzed. At 538, method 500 uses splice point controller 118 to determine whether the identified frame is accurate (see FIG. 4). If method 500 determines that the identified frame is accurate at 538, at 540 method 500 evaluates a next splice point by returning to 532. If there is no next splice point for the transport stream, method 500 ends at 541.

If method 500 determines that the identified frame associated with the splice point is not accurate at 538, method 500 proceeds to 542 and uses splice point controller 118 to identify a nearest frame, relative to the identified frame associated with the splice point, as an accurate frame that corresponds with one of: the first frame type and a scene change score that is greater than the scene change score of the identified frame; the second frame type and a scene change score that is greater than the scene change score of the identified frame; or the first frame type and the second frame type.

After identifying a nearest frame that satisfies the splice point adjustment conditions at 542, method 500 proceeds to 544 and uses splice point controller 118 to determine a time difference between the nearest frame and the identified frame associated with the splice point. At 546, method 500 uses splice point controller 118 to provide the time difference to secondary content source 116 as a second offset value. According to one aspect, splice point controller 118 is configured to count the number of frames that the identified frame associated with the splice point is from the accurate frame and divide by 59.94 to determine the time difference. If there is a next splice point to analyze at 548, method 500 returns to 510. If there is no next splice point to analyze, method 500 ends at 550. According to an aspect, dedicated processing threads may be used to simultaneously or near simultaneously analyze the input to and the output from splicer 206 as part of dynamically adjusting one or more locations of one or more splice points of a transport stream.

According to an alternative embodiment, method 500 can be configured determine a nearest frame to use for a splice point by: identifying two previous frames in the input index file relative to the splice point and identify corresponding frames in the output index file; comparing the frame types and scene change values for the two previous frames and corresponding frames; and determining that a nearest frame, from the two previous frames and corresponding frames, to the splice point is the accurate frame. Method 500 provides a technical solution to a technical problem in part by dynamically adapting to content boundary misalignments, inherent processing delays, and/or inadequate communications arising when processing video as part of providing primary and/or secondary content to end-user equipment.

FIGS. 6A-6E depict an example of dynamically adjusting splice point parameters and providing feedback signals with adjustment values according to an aspect. FIG. 6A depicts an example output from splice point controller 118 after executing a first command as part of determining whether to adjust an adjustment value associated with a location of a splice point of a transport stream. According to one aspect, splice point controller 118 executes the first command (e.g., ffprobe) on a first portion or time period of the transport stream received at splicer 206 from transcoder farm 204 by joining the (S, G) associated with transcoder 204 output to generate a first index file (e.g., input index). According to one aspect, splice point controller 118 creates a copy of the original transport stream with frame numbers by executing a command (e.g., ffmpeg) before executing the first command (e.g., ffprobe).

FIG. 6A depicts a portion of the copy of the original transport stream, that includes frame numbers, of an example transport stream after splice point controller 118 has executed ffmpeg. FIG. 6B depicts an example output after splice point controller 118 has executed the first command (e.g., ffprobe) on the copy of the example transport stream. FIG. 6C depicts an example output after splice point controller 118 executed the second command (e.g., tstables) to output splice point information associated with the example transport stream as input to splicer 206.

As shown in FIG. 6C, a first splice point has an adjustment value (e.g., pts_adjustment value) of 3,605,047,689. Splice point controller 118 uses the adjustment value to search the input index to locate a frame that corresponds with the adjustment value associated with a secondary content placement opportunity (e.g., distributor placement opportunity start). As shown in FIG. 6B, splice point controller 118 has identified frame 9057 in indexfile1.txt as corresponding to the adjustment value of 3,605,047,689 (e.g., pkt_pts=3605047689). Pkt_pts refers to presentation time stamp and pict_type refers to a type of frame, (I/B/P frames). Splice point controller 118 has determined that the SCTE-35 splice point is at frame number 9057, an I frame with a time of 40056.085433. However, splice point controller 118 has determined that frame 9057 is not an accurate frame and that a nearest frame for a secondary content boundary (e.g., advertisement boundary) is frame 9032.

Correspondingly, without adjusting the adjustment value, downstream devices will insert secondary content at frame 9057 instead of frame 9032. As described above, splice point controller 118 is configured to determine, and provide as feedback, a first offset value that is required to adjust for insertion of secondary content at frame 9032 instead of frame 9057. Frame 9032 is an I frame having a time of 40055.668356. Splice point controller 118 determines that transcoder farm 204 should compensate for the discrepancy by making an adjustment to the splice point location by about −0.417077 milliseconds (i.e., difference between 40055.668356 and 40056.085433). As described above, splice point controller 118 provides the offset value to SPE 202 as a feedback signal (e.g., HTTP post, XML, JSON, etc.), SPE 202 then provides the offset value (e.g., in response to an ESAM request) to transcoder farm 204 for use in adjusting the splice point so that the secondary content insertion occurs at frame 9032.

FIG. 6D depicts an example output (e.g., output index) after splice point controller 118 executed the first command (e.g., ffprobe) on the signal output from splicer 206 by joining the (S, G) associated with splicer 206 output in conjunction with secondary content source 116. According to one aspect, splice point controller 118 creates a copy of the transport stream (e.g., the signal output from splicer 206) with frame numbers by executing a command (e.g., ffrnpeg) before executing the first command (e.g., ffprobe). FIG. 6E depicts an example output after splice point controller 118 executed the second command (e.g., tstables) to output splice point information associated with signal output from splicer 206. As shown in FIG. 6E, a first splice point has an adjustment value (e.g., pts_adjustment) of 3,605,050,422 at time 40056.115800.

Splice point controller 118 uses the adjustment value to search the output index file to locate a corresponding frame associated with a secondary content placement opportunity (e.g., distributor placement opportunity start). As shown in FIG. 6D, splice point controller 118 has identified frame 9056 in indexfile2.txt (i.e., output index file) as corresponding to the adjustment value of 3,605,050,422 (e.g., pkt_pts=3605050422). Splice point controller 118 has determined that the SCTE-35 splice point is at frame number 9056, a P frame with a time of 40056.115800 (see FIG. 6D). However, splice point controller 118 determines that the secondary content boundary (e.g., advertisement boundary) exists at frame 9037 at time 40055.782144.

As described above, splice point controller 118 is configured to determine, and provide additional feedback to secondary content source 116 comprising a second offset value that is required to adjust for insertion of secondary content at frame 9037. Frame 9037 is an I frame having a time of 40055.782144 Splice point controller 118 determines that secondary content source 116 should compensate for the discrepancy by making an adjustment to the splice point location by about 0.333656 milliseconds (i.e., difference between 40056.115800 and 40055.782144). As described above, splice point controller 118 provides the second offset value to secondary content source 116 as a feedback signal (e.g., HTTP post, XML, JSON, stream properties file, etc.). Secondary content source 116 applies the second offset value so that the secondary content insertion location occurs at frame 9037. According to one aspect, splice point controller 118 and/or secondary content source 116 accounts for the first offset by subtracting the first offset from the second offset to determine a final offset value to be used for the location of the splice point to be applied by splicer 106.

Figure 7:
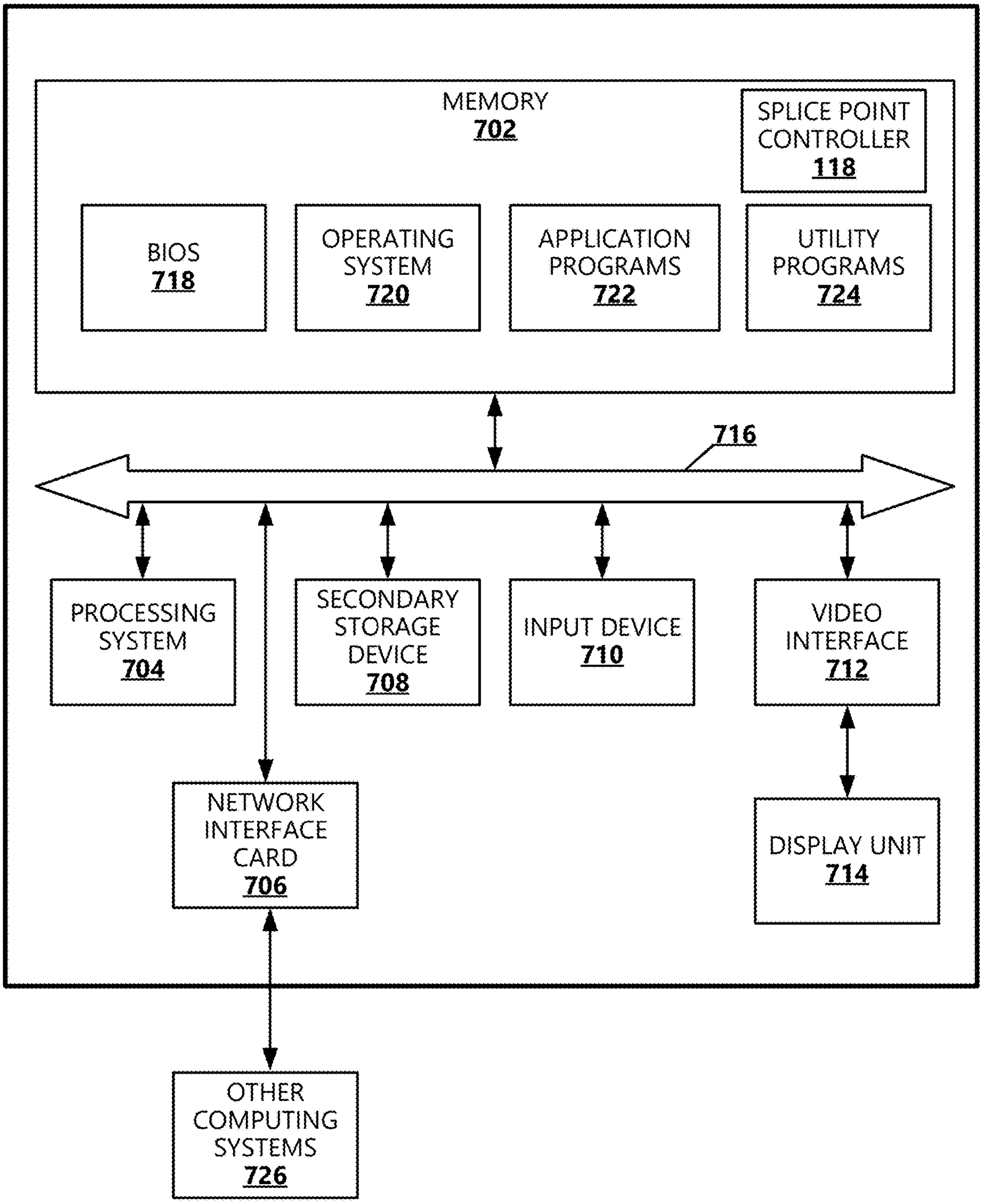
FIG. 7 is a block diagram illustrating example physical components of a computing device or system with which embodiments may be practiced.

FIG. 7 is a block diagram illustrating example physical components of a computing device 700 or system with which embodiments may be practiced. It should be appreciated that in other embodiments, different hardware components other than those illustrated in the example of FIG. 7 may be used. Computing devices may be implemented in different ways in different embodiments. For instance, in the example of FIG. 7, the computing device 700 includes a processing system 704, memory 702, a network interface card 706 (wired and/or wireless, cellular type, 802.11 type, etc.), a secondary storage device 708, an input device 710, a video interface 712, a display unit 714, and a communications medium 716. In other embodiments, the computing device 700 may be implemented using more or fewer hardware components (e.g., a video interface, a display unit, or an input device) or in combination with other types of computer systems and applications 726.

The memory 702 includes one or more computer-readable storage media capable of storing data and/or computer-executable instructions. Memory 702 may store the computer-executable instructions that, when executed by a processor of the processing system 704, cause allocation and/or reallocation operations as part of load balancing internal connections. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., cellular, WI-FI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores splice point controller 118, a Basic Input/Output System (BIOS) 718, an operating system 720, etc. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 or program code that, when executed by the processing system 704, cause the computing device 700 to provide applications (e.g., application 128) to users. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 8:
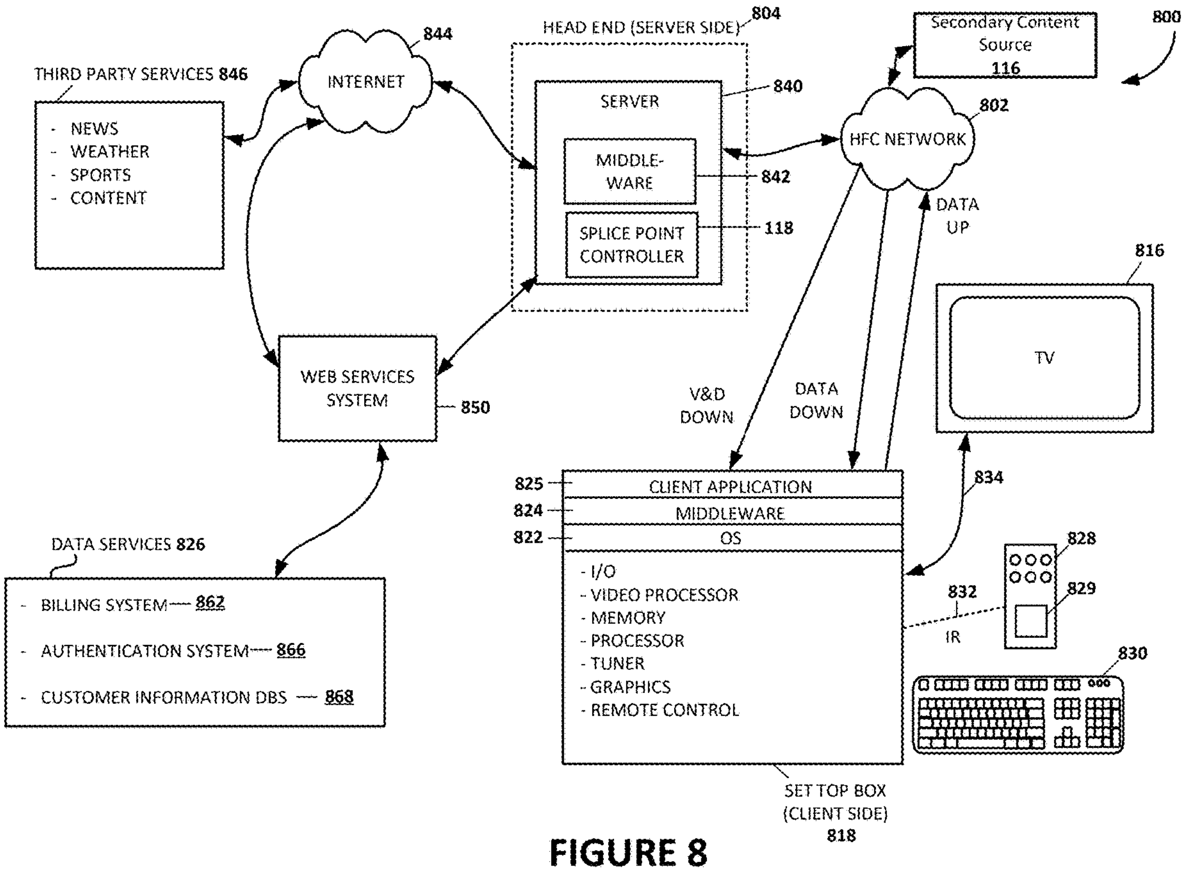
FIG. 8 is a block diagram illustrating components of a system architecture providing an example operating environment according to aspects of the present disclosure.

FIG. 8 is a block diagram illustrating a cable television services system 800 (hereafter referred to as "CATV") architecture providing an operating environment according to an aspect. As should be appreciated, a CATV services system 800 is but one of various types of systems that can be utilized for providing an operating environment for one or more aspects described herein. Referring now to FIG. 8, digital and analog video programming, information content and interactive television services are provided via a HFC network 802 to a television set 816 for consumption by a cable television/services system customer. As is known to those skilled in the art, HFC networks 802 combine both fiber optic cable lines and coaxial cable lines. Typically, fiber optic cable lines run from the cable head end 820 or 104 to neighborhoods of subscribers. Coaxial cable lines run from the optical fiber feeders to each customer or subscriber. As shown in FIG. 8, secondary content source 116 is in communication with headend 820 for providing secondary or alternate content for splicing into a primary content feed. Secondary content source 116 may be controlled by service provider 102 or a third-party system.

The CATV system 800 is in the form of a distributed client-server computing system for providing video and data flow across the HFC network 802 between server-side services providers (e.g., cable television/services providers) via a server-side head end 820 and a client-side customer via a set-top box (STB) 818 functionally connected to a customer receiving device, such as the television set 816. The functionality of the HFC network 802 allows for efficient bidirectional data flow between the set-top box 818 and an application server 840 of the server-side head end 820. As is understood by those skilled in the art, modern CATV systems 800 can provide a variety of services across the HFC network 802 including traditional digital and analog video programming, telephone services, high speed Internet access, video-on-demand, and services.

On the client side of the CATV system 800, digital and analog video programming and digital and analog data are provided to the customer television set 816 via the STB 818. In some examples, a digital receiver may be embodied as the STB 818. Interactive television services that allow a customer to input data to the CATV system 800 likewise are provided by the STB 818. As illustrated in FIG. 8, the STB 818 is a multipurpose computing device having a computer processor, memory, and an input/output mechanism. The input/output mechanism receives input from server-side processes via the HFC network 802 and from customers via input devices such as a remote control device 828, keyboard 830, or other computing device, such as a tablet/slate computer, smart phone, etc. The remote control device 828 and the keyboard 830 can communicate with the STB 818 via a suitable communication transport such as the infrared connection 832. The STB 818 also includes a video processor for processing and providing digital and analog video signaling to the television set 816 via a cable communication transport 834. A multi-channel tuner is provided for processing video and data to and from the STB 818 and the server-side head end 820 or 104, described below.

The STB 818 also includes an operating system 822 for directing the functions of the STB 818 in conjunction with a variety of client applications 825. For example, if a client application 825 requires a news flash from a third party news source to be displayed on the television 816, the operating system 822 can cause the graphics functionality and video processor of the STB 818, for example, to output the news flash to the television 816 at the direction of the client application 825 responsible for displaying news items.

Because a variety of different operating systems 822 can be utilized by a variety of different brands and types of set-top boxes 818, a middleware layer 824 can be provided to allow a given software application to be executed by a variety of different operating systems. According to an embodiment, the middleware layer 824 can include a set of application programming interfaces (APIs) that are exposed to client applications and operating systems 822 that allow client applications 825 to communicate with the operating systems 822 through common data calls understood via the API set. As described below, a corresponding middleware layer 842 is included on the server side of the CATV system 800 for facilitating communication between the server-side application server and the client-side STB 818. The middleware layer 842 of the server-side application server and the middleware layer 824 of the client-side STB 818 can format data passed between the client side and server side according to the Extensible Markup Language (XML).

According to one aspect, the STB 818 passes digital and analog video and data signaling to the television 816 via a one-way communication transport 834. According to other aspects, two-way communication transports can be utilized, for example, via high definition multimedia (HDMI) ports. The STB 818 can receive video and data from the server side of the CATV system 800 via the HFC network 802 through a video/data downlink and data via a data downlink. The STB 818 can transmit data from the client side of the CATV system 800 to the server side of the CATV system 800 via the HFC network 802 via one data uplink. The video/data downlink is an "in band" downlink that allows for digital and analog video and data signaling from the server side of the CATV system 800 through the HFC network 802 to the STB 818 for use by the STB 818 and for distribution to the television set 816. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 8, between the HFC network 802 and the STB 818 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 818 and the server-side application server 840 is typically passed through the "out of band" data links. Alternatively, an "in band" data carousel can be positioned in an "in band" channel into which a data feed can be processed from the application server 840 through the HFC network 802 to the STB 818. Operation of data transport between components of the CATV system 800, described with reference to FIG. 8, is well known to those skilled in the art.

Referring still to FIG. 8, the head end 820 of the CATV system 800 is positioned on the server side of the CATV system and includes hardware and software systems responsible for originating and managing content for distributing through the HFC network 802 to client-side STBs 818 for presentation to customers. As described above, a number of services can be provided by the CATV system 800, including digital and analog video programming, interactive television services, telephone services, video-on-demand services, targeted advertising, internet services, and/or provision of supplemental content.

The application server 840 can be configured as a computing system operative to assemble and manage data sent to and received from the STB 818 via the HFC network 802. As described above, the application server 840 includes a middleware layer 842 for processing and preparing data from the head end 820 of the CATV system 800 for receipt and use by the client-side STB 818. For example, the application server 840 via the middleware layer 842 can obtain supplemental content from third party services 846 via the Internet 844 for transmitting to a customer through the HFC network 802, the STB 818, and recording by a local or remote DVR. For example, content metadata from a third party content provider service can be downloaded by the application server 840 via the Internet 844. When the application server 840 receives the downloaded content metadata, the middleware layer 842 can be utilized to format the content metadata for receipt and use by the STB 818. Therefore, content metadata can be sent and categorized based on the availability to the customer's program guide data.

According to one embodiment, data obtained and managed by the middleware layer 842 of the application server 840 is formatted according to the Extensible Markup Language and is passed to the STB 818 through the HFC network 802 where the XML-formatted data can be utilized by a client application 825 in concert with the middleware layer 824, as described above. As should be appreciated by those skilled in the art, a variety of third party services data 846, including news data, weather data, sports data and other information content can be obtained by the application server 840 via distributed computing environments such as the Internet 844 for provision to customers via the HFC network 802 and the STB 818. Additionally, the application server 840 may receive data via the Internet 844.

According to aspects, the application server 840 obtains customer support services data, including billing data, information on customer work order status, answers to frequently asked questions, services provider contact information, and the like from data services 826 for provision to the customer via an interactive television session. The data services 826 include a number of services operated by the services provider of the CATV system 800 which can include profile and other data associated with a given customer.

A billing system 862 can include information such as a customer's name, street address, business identification number, Social Security number, credit history, and information regarding services and products subscribed to by the customer. According to embodiments, the billing system 862 can also include billing data for services and products subscribed to by the customer for bill processing, billing presentment and payment receipt. An authentication system 866 can include information such as secure user names, subscriber profiles, subscriber IDs, and passwords utilized by customers for access to network services. A customer information database 868 can include general information about customers such as place of employment, business address, business telephone number, and demographic information such as age, gender, educational level, and the like. The customer information database 868 can also include information on pending work orders for services or products ordered by the customer. The customer information database 868 can also include general customer information such as answers to frequently asked customer questions and contact information for various service provider offices/departments. As should be understood, this information can be stored in a variety of disparate databases operated by the cable services provider.

Referring still to FIG. 8, web services system 850 is illustrated between the application server 840 and the data services 826. According to aspects, web services system 850 serves as a collection point for data requested from each of the disparate data services systems comprising the data services 826. According to aspects, when the application server 840 requires customer services data from one or more of the data services 826, the application server 840 passes a data query to the web services system 850. The web services system 850 formulates a data query to each of the available data services systems for obtaining any required data for a requesting customer as identified by a set-top box identification associated with the customer. The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above. As should be understood by those skilled in the art, the disparate systems 850, 862, 866, 868 can be integrated or provided in any combination of separate systems, wherein FIG. 8 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A method for adjustment of video signal splice points, comprising:

analyzing a video signal input to a splicer;

identifying a splice point from the input video signal;

extracting an adjustment value associated with the splice point from the input video signal;

identifying a frame in the input video signal that corresponds with the extracted adjustment value;

determining whether the identified frame is accurate;

in response to determining that the identified frame is not accurate:

identifying a nearest frame, relative to the identified frame, that is an accurate frame for a secondary content boundary;

determining a time difference between the nearest frame and the identified frame; and providing the time difference to a signal processing engine as a first offset value.

2. The method of claim 1, wherein the signal processing engine updates splice point parameters according to the first offset value.

3. The method of claim 2, wherein the signal processing engine provides the first offset value to a transcoder, in either original or updated form.

4. The method of claim 3, further comprising:

analyzing a video signal output from the splicer;

identifying a splice point from the output video signal;

extracting an adjustment value associated with the splice point from the output video signal;

identifying a frame in the output video signal that corresponds with the extracted adjustment value;

determining whether the identified frame is accurate;

in response to determining that the identified frame is not accurate:

identifying a nearest frame, relative to the identified frame, that is an accurate frame for a secondary content boundary;

determining a time difference between the nearest frame and the identified frame; and providing the time difference to a secondary content source as a second offset value.

5. The method of claim 4, further comprising:

determining, by the transcoder and based on the first offset value received from the signal processing engine, the location of the splice point in the input video signal;

determining, by the secondary content source and the second offset value, the secondary content to be inserted in the input video signal; and inserting the secondary content at the determined location in the input video signal.

6. The method of claim 4, wherein the splice point controller is further configured to provide a final adjustment value to the secondary content server based on a difference between the second offset value and the first offset value.

7. The method of claim 1, wherein the method further comprises determining a nearest frame for use as a splice point by:

identifying two previous frames in the video signal relative to the identified splice point;

identifying frames in the output file that correspond to the identified two frames;

comparing frame types and scene change values for the two identified frames with the identified corresponding frames;

determining that one of the identified two frames and the corresponding frames is nearest to the identified splice point; and in response to the determination, designating the one of the identified and corresponding frames is the nearest frame.

8. The method of claim 1, wherein the splice point controller is further configured to capture and sample a duration of live video content at certain times without having to monitor a live broadcast continuously.

9. A system comprising:

a signal processing engine; and a splice point controller in communication with the signal processing engine and configured to:

analyze a video signal input to a splicer;

identify a splice point from the input video signal;

extract an adjustment value associated with the splice point from the input video signal;

identify a frame in the input video signal that corresponds with the extracted adjustment value;

determine whether the identified frame is accurate;

in response to determining that the identified frame is not accurate:

identify a nearest frame, relative to the identified frame, that is an accurate frame for a secondary content boundary;

determine a time difference between the nearest frame and the identified frame; and provide the time difference to a signal processing engine as a first offset value.

10. The system of claim 9, wherein the signal processing engine updates splice point parameters according to the first offset value.

11. The system of claim 10, wherein the signal processing engine provides the first offset value to a transcoder, in either original or updated form.

12. The system of claim 11, wherein the splice point controller is further configured to:

analyze a video signal output from the splicer;

identify a splice point from the output video signal;

extract an adjustment value associated with the splice point from the output video signal;

identify a frame in the output video signal that corresponds with the extracted adjustment value;

determine whether the identified frame is accurate;

in response to determining that the identified frame is not accurate:

identify a nearest frame, relative to the identified frame, that is an accurate frame for a secondary content boundary;

determine a time difference between the nearest frame and the identified frame; and provide the time difference to a secondary content source as a second offset value.

13. The system of claim 12, further comprising:

determine, by the transcoder and based on the first offset value received from the signal processing engine, the location of the splice point in the input video signal;

determine, by the secondary content source and the second offset value, the secondary content to be inserted in the input video signal; and insert the secondary content at the determined location in the input video signal.

14. The system of claim 9, wherein the splice point controller is further configured to capture and sample a duration of live video content at certain times without having to monitor a live broadcast continuously.

15. A server machine, comprising:

a processor; and memory that includes instructions, which when executed by the processor, cause the processor to:

analyze a video signal input to a splicer;

identify a splice point from the input video signal;

extract an adjustment value associated with the splice point from the input video signal;

identify a frame in the input video signal that corresponds with the extracted adjustment value;

determine whether the identified frame is accurate;

in response to determining that the identified frame is not accurate:

identify a nearest frame, relative to the identified frame, that is an accurate frame for a secondary content boundary;

determine a time difference between the accurate frame and the identified frame; and provide the time difference to a signal processing engine as a first offset value.

16. The server machine of claim 15, wherein the signal processing engine updates splice point parameters according to the first offset value.

17. The server machine of claim 15, wherein the signal processing engine provides the first offset value to a transcoder, in either original or updated form.

18. The server machine of claim 15, wherein the server machine is further configured to:

analyze a video signal output from the splicer;

identify a splice point from the output video signal;

extract an adjustment value associated with the splice point from the output video signal;

identify a frame in the output video signal that corresponds with the extracted adjustment value;

determine whether the identified frame is accurate;

in response to determining that the identified frame is not accurate:

identify a nearest frame, relative to the identified frame, that is an accurate frame for a secondary content boundary;

determine a time difference between the nearest frame and the identified frame; and provide the time difference to a secondary content source as a second offset value.

19. The server machine of claim 18, further comprising:

determine, by the transcoder and based on the first offset value received from the signal processing engine, the location of the splice point in the input video signal;

determine, by the secondary content source and the second offset value, the secondary content to be inserted in the input video signal; and insert the secondary content at the determined location in the input video signal.

20. The server machine of claim 19, wherein the signal processing engine uses the first offset value for location of the splice point, and the secondary content source uses the second offset value when providing secondary content to the splicer.

* * * * *